(12) United States Patent
Borran et al.

(10) Patent No.: US 8,442,572 B2
(45) Date of Patent: May 14, 2013

(54) METHOD AND APPARATUS FOR ADJUSTMENTS FOR DELTA-BASED POWER CONTROL IN WIRELESS COMMUNICATION SYSTEMS

(75) Inventors: Mohammad Jaber Borran, San Diego, CA (US); Aamod Khandekar, San Diego, CA (US); Alexei Gorokhov, San Diego, CA (US); Tingfang Ji, San Diego, CA (US); Naga Bhushan, San Diego, CA (US); Xin Zhang, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 901 days.

(21) Appl. No.: 11/848,865

(22) Filed: Aug. 31, 2007

(65) Prior Publication Data

US 2008/0161033 A1 Jul. 3, 2008

Related U.S. Application Data

(60) Provisional application No. 60/843,365, filed on Sep. 8, 2006, provisional application No. 60/862,765, filed on Oct. 24, 2006.

(51) Int. Cl.
*H04B 7/185* (2006.01)
*H04B 7/00* (2006.01)

(52) U.S. Cl.
USPC .......................................... 455/522; 370/318

(58) Field of Classification Search .................. 455/522; 370/318
See application file for complete search history.

(56) References Cited

U.S. PATENT DOCUMENTS

| | | | |
|---|---|---|---|
| 3,577,080 | A | 5/1971 | Cannalte |
| 4,225,976 | A | 9/1980 | Osborne et al. |

(Continued)

FOREIGN PATENT DOCUMENTS

| | | |
|---|---|---|
| CA | 2340201 A1 | 1/2001 |
| CA | 2635291 A1 | 10/2007 |

(Continued)

OTHER PUBLICATIONS

Partial International Search Report-PCT/US2007/077672, International Searching Authority-European Patent Office-Feb. 22, 2008.

(Continued)

*Primary Examiner* — Bobbak Safaipour
(74) *Attorney, Agent, or Firm* — Darrell Scott Juneau; Mary A. Fales

(57) ABSTRACT

Systems and methodologies are described that provide techniques for performing adjustments for delta-based power control and interference management in a wireless communication system. A terminal can utilize one or more delta-based power control techniques described herein upon engaging in a reverse link transmission after a predetermined period of silence or after receiving indications of interference from neighboring access points. A delta value can be computed through open-loop projection, based on which transmission resources such as bandwidth and/or transmit power can be increased or decreased to manage interference caused by the terminal. A delta value, other feedback from the terminal, and/or indications of interference caused by the terminal can also be communicated as feedback to a serving access point to allow the access point to assign transmission resources for the terminal.

23 Claims, 14 Drawing Sheets

U.S. PATENT DOCUMENTS

| | | | |
|---|---|---|---|
| 4,539,684 A | 9/1985 | Kloker | |
| 4,638,479 A | 1/1987 | Alexis | |
| 4,901,307 A | 2/1990 | Gilhousen et al. | |
| 4,908,827 A | 3/1990 | Gates | |
| 5,103,459 A | 4/1992 | Gilhousen et al. | |
| 5,267,262 A | 11/1993 | Wheatley, III et al. | |
| 5,301,364 A | 4/1994 | Arens et al. | |
| 5,396,516 A | 3/1995 | Padovani et al. | |
| 5,406,613 A | 4/1995 | Peponides et al. | |
| 5,448,600 A | 9/1995 | Lucas | |
| 5,469,471 A | 11/1995 | Wheatley, III et al. | |
| 5,548,812 A | 8/1996 | Padovani et al. | |
| 5,559,790 A | 9/1996 | Yano et al. | |
| 5,574,984 A | 11/1996 | Reed et al. | |
| 5,722,063 A | 2/1998 | Peterzell et al. | |
| 5,734,646 A * | 3/1998 | I et al. | 370/335 |
| 5,754,533 A | 5/1998 | Bender et al. | |
| 5,774,785 A | 6/1998 | Karlsson et al. | |
| 5,784,363 A | 7/1998 | Engstrom et al. | |
| 5,815,507 A | 9/1998 | Vinggaard et al. | |
| 5,839,056 A | 11/1998 | Hakkinen | |
| 5,859,383 A | 1/1999 | Davison et al. | |
| 5,933,768 A | 8/1999 | Skold et al. | |
| 5,956,642 A | 9/1999 | Larsson et al. | |
| 5,961,588 A | 10/1999 | Cooper et al. | |
| 5,995,488 A | 11/1999 | Kalkunte et al. | |
| 5,996,103 A | 11/1999 | Jahanghir | |
| 5,996,110 A | 11/1999 | Kosmach | |
| 6,006,073 A | 12/1999 | Glauner et al. | |
| 6,012,160 A | 1/2000 | Dent et al. | |
| 6,038,220 A | 3/2000 | Kang et al. | |
| 6,044,072 A | 3/2000 | Ueda | |
| 6,047,189 A | 4/2000 | Yun et al. | |
| 6,061,339 A | 5/2000 | Nieczyporowicz et al. | |
| 6,075,974 A | 6/2000 | Saints et al. | |
| 6,101,179 A * | 8/2000 | Soliman | 370/342 |
| 6,112,325 A | 8/2000 | Burshtein | |
| 6,144,841 A | 11/2000 | Feeney et al. | |
| 6,154,659 A | 11/2000 | Jalali et al. | |
| 6,173,187 B1 | 1/2001 | Salonaho et al. | |
| 6,173,188 B1 | 1/2001 | Kim | |
| 6,175,587 B1 | 1/2001 | Madhow et al. | |
| 6,175,588 B1 | 1/2001 | Visotsky et al. | |
| 6,181,738 B1 | 1/2001 | Chheda et al. | |
| 6,188,678 B1 | 2/2001 | Prescott | |
| 6,192,249 B1 | 2/2001 | Padovani | |
| 6,208,699 B1 | 3/2001 | Chen et al. | |
| 6,212,364 B1 | 4/2001 | Park | |
| 6,216,006 B1 | 4/2001 | Scholefield et al. | |
| 6,226,529 B1 | 5/2001 | Bruno et al. | |
| 6,397,070 B1 | 5/2002 | Black | |
| 6,446,236 B1 | 9/2002 | McEwen et al. | |
| 6,449,463 B1 | 9/2002 | Schiff | |
| 6,519,705 B1 | 2/2003 | Leung et al. | |
| 6,532,563 B2 | 3/2003 | Nobelen | |
| 6,539,065 B1 | 3/2003 | Furukawa | |
| 6,553,231 B1 | 4/2003 | Karlsson et al. | |
| 6,560,744 B1 | 5/2003 | Burshtein | |
| 6,560,774 B1 | 5/2003 | Gordon et al. | |
| 6,574,211 B2 | 6/2003 | Padovani et al. | |
| 6,597,705 B1 | 7/2003 | Rezaiifar et al. | |
| 6,597,923 B1 | 7/2003 | Vanghi et al. | |
| 6,597,932 B2 | 7/2003 | Tian et al. | |
| 6,603,746 B1 | 8/2003 | Larijani et al. | |
| 6,611,507 B1 | 8/2003 | Hottinen et al. | |
| 6,621,454 B1 | 9/2003 | Reudink et al. | |
| 6,628,956 B2 | 9/2003 | Bark et al. | |
| 6,643,520 B1 | 11/2003 | Park et al. | |
| 6,697,634 B1 | 2/2004 | Hayashi | |
| 6,711,150 B1 | 3/2004 | Vanghi et al. | |
| 6,711,515 B1 | 3/2004 | Lehtinen et al. | |
| 6,717,976 B1 | 4/2004 | Shen et al. | |
| 6,721,373 B1 | 4/2004 | Frenkel et al. | |
| 6,744,743 B2 | 6/2004 | Walton et al. | |
| 6,745,045 B2 | 6/2004 | Terry et al. | |
| 6,751,444 B1 | 6/2004 | Meiyappan et al. | |
| 6,763,244 B2 | 7/2004 | Chen et al. | |
| 6,801,515 B1 | 10/2004 | Ishikawa et al. | |
| 6,801,759 B1 | 10/2004 | Saifuddin | |
| 6,807,164 B1 | 10/2004 | Almgren et al. | |
| 6,895,245 B2 | 5/2005 | Wallentin et al. | |
| 6,950,669 B2 | 9/2005 | Simonsson et al. | |
| 6,952,591 B2 | 10/2005 | Budka et al. | |
| 6,968,201 B1 | 11/2005 | Gandhi et al. | |
| 6,977,912 B1 | 12/2005 | Porter et al. | |
| 7,012,912 B2 | 3/2006 | Naguib et al. | |
| 7,054,275 B2 | 5/2006 | Kim et al. | |
| 7,058,421 B2 | 6/2006 | Ngai et al. | |
| 7,072,315 B1 | 7/2006 | Liu et al. | |
| 7,103,316 B1 | 9/2006 | Hall | |
| 7,145,935 B2 | 12/2006 | Won et al. | |
| 7,158,450 B2 | 1/2007 | Wada et al. | |
| 7,158,504 B2 | 1/2007 | Kadaba et al. | |
| 7,181,170 B2 | 2/2007 | Love et al. | |
| 7,184,381 B2 | 2/2007 | Ohkubo et al. | |
| 7,215,653 B2 | 5/2007 | Kim et al. | |
| 7,224,993 B2 | 5/2007 | Meyers et al. | |
| 7,254,158 B2 | 8/2007 | Agrawal et al. | |
| 7,302,276 B2 | 11/2007 | Bernhardsson et al. | |
| 7,310,526 B2 | 12/2007 | Sang et al. | |
| 7,324,785 B2 | 1/2008 | Hansen et al. | |
| 7,349,667 B2 | 3/2008 | Magee et al. | |
| 7,359,727 B2 | 4/2008 | Tsien et al. | |
| 7,359,838 B2 * | 4/2008 | Marro et al. | 702/194 |
| 7,400,887 B2 | 7/2008 | Azman et al. | |
| 7,420,939 B2 | 9/2008 | Laroia et al. | |
| 7,477,920 B2 | 1/2009 | Scheinert et al. | |
| 7,536,626 B2 | 5/2009 | Sutivong et al. | |
| 7,594,151 B2 | 9/2009 | Sutivong et al. | |
| 7,623,490 B2 | 11/2009 | Khandekar et al. | |
| 7,639,943 B1 | 12/2009 | Kalajan | |
| 7,808,895 B2 * | 10/2010 | Nalawadi et al. | 370/230 |
| 7,962,826 B2 | 6/2011 | Sutivong et al. | |
| 7,965,789 B2 | 6/2011 | Khandekar et al. | |
| 8,095,166 B2 | 1/2012 | Sampath et al. | |
| 8,116,800 B2 | 2/2012 | Gorokhov et al. | |
| 8,150,448 B2 * | 4/2012 | Farnsworth et al. | 455/522 |
| 2001/0040880 A1 | 11/2001 | Chen et al. | |
| 2001/0053695 A1 | 12/2001 | Wallentin et al. | |
| 2001/0055968 A1 | 12/2001 | Yoshida et al. | |
| 2002/0018446 A1 | 2/2002 | Huh et al. | |
| 2002/0077138 A1 | 6/2002 | Bark et al. | |
| 2002/0077985 A1 | 6/2002 | Kobata et al. | |
| 2002/0102984 A1 | 8/2002 | Furuskar et al. | |
| 2002/0141349 A1 | 10/2002 | Kim et al. | |
| 2002/0145968 A1 | 10/2002 | Zhang et al. | |
| 2002/0167907 A1 | 11/2002 | Sarkar et al. | |
| 2002/0187801 A1 * | 12/2002 | Vanghi | 455/522 |
| 2003/0012425 A1 | 1/2003 | Suzuki et al. | |
| 2003/0013451 A1 | 1/2003 | Walton | |
| 2003/0016770 A1 | 1/2003 | Trans et al. | |
| 2003/0069014 A1 | 4/2003 | Raffel et al. | |
| 2003/0081538 A1 | 5/2003 | Walton et al. | |
| 2003/0086371 A1 * | 5/2003 | Walton et al. | 370/235 |
| 2003/0109274 A1 | 6/2003 | Budka et al. | |
| 2003/0123425 A1 | 7/2003 | Walton et al. | |
| 2003/0128705 A1 | 7/2003 | Yi et al. | |
| 2003/0185159 A1 | 10/2003 | Seo et al. | |
| 2003/0185285 A1 | 10/2003 | Talwar | |
| 2004/0038699 A1 | 2/2004 | Toono | |
| 2004/0062192 A1 | 4/2004 | Liu et al. | |
| 2004/0077370 A1 | 4/2004 | Dick et al. | |
| 2004/0081121 A1 | 4/2004 | Xu | |
| 2004/0095880 A1 | 5/2004 | Laroia et al. | |
| 2004/0109432 A1 | 6/2004 | Laroia et al. | |
| 2004/0151109 A1 | 8/2004 | Batra et al. | |
| 2004/0166886 A1 | 8/2004 | Laroia et al. | |
| 2004/0166900 A1 | 8/2004 | Qiu et al. | |
| 2004/0203455 A1 | 10/2004 | Bao et al. | |
| 2004/0229615 A1 | 11/2004 | Agrawal | |
| 2004/0229639 A1 | 11/2004 | Meyers et al. | |
| 2005/0002324 A1 | 1/2005 | Sutivong et al. | |
| 2005/0013283 A1 | 1/2005 | Yoon et al. | |
| 2005/0026624 A1 | 2/2005 | Gandhi et al. | |
| 2005/0037796 A1 | 2/2005 | Tsai et al. | |
| 2005/0096061 A1 | 5/2005 | Ji et al. | |
| 2005/0128970 A1 | 6/2005 | Tsien et al. | |

| Publication | Date | Inventor |
|---|---|---|
| 2005/0143118 A1 | 6/2005 | Bernhardsson et al. |
| 2005/0176455 A1 | 8/2005 | Krishnan et al. |
| 2005/0192042 A1 | 9/2005 | Au et al. |
| 2005/0276248 A1 | 12/2005 | Butala et al. |
| 2005/0283715 A1 | 12/2005 | Sutivong et al. |
| 2006/0009226 A1 | 1/2006 | Vicharelli et al. |
| 2006/0019496 A1 | 1/2006 | Onishi et al. |
| 2006/0019694 A1 | 1/2006 | Sutivong et al. |
| 2006/0025158 A1 | 2/2006 | Leblanc et al. |
| 2006/0034173 A1 | 2/2006 | Teague et al. |
| 2006/0089154 A1 | 4/2006 | Laroia et al. |
| 2006/0105796 A1 | 5/2006 | Malladi et al. |
| 2006/0135080 A1 | 6/2006 | Khandekar et al. |
| 2006/0135169 A1 | 6/2006 | Sampath et al. |
| 2006/0164993 A1 | 7/2006 | Teague et al. |
| 2006/0165650 A1 | 7/2006 | Pavone et al. |
| 2006/0171326 A1 | 8/2006 | Durand et al. |
| 2006/0187885 A1 | 8/2006 | Roy et al. |
| 2006/0189344 A1 | 8/2006 | Umesh et al. |
| 2006/0209721 A1 | 9/2006 | Mese et al. |
| 2006/0211441 A1 | 9/2006 | Mese et al. |
| 2006/0234752 A1 | 10/2006 | Mese et al. |
| 2006/0285503 A1 | 12/2006 | Mese et al. |
| 2007/0030827 A1 | 2/2007 | Rui et al. |
| 2007/0041429 A1 | 2/2007 | Khandekar |
| 2007/0081491 A1 | 4/2007 | Kim et al. |
| 2007/0150799 A1 | 6/2007 | Sutivong et al. |
| 2007/0161385 A1 | 7/2007 | Anderson |
| 2007/0249363 A1 | 10/2007 | Amalfitano et al. |
| 2007/0258525 A1 | 11/2007 | Jacobsen et al. |
| 2007/0270100 A1 | 11/2007 | Agrawal et al. |
| 2007/0280170 A1 | 12/2007 | Kawasaki et al. |
| 2007/0286105 A1 | 12/2007 | Kim et al. |
| 2008/0014980 A1 | 1/2008 | Yano et al. |
| 2008/0031380 A1 | 2/2008 | Takabayashi et al. |
| 2008/0037439 A1 | 2/2008 | Cave et al. |
| 2008/0039129 A1 | 2/2008 | Li et al. |
| 2008/0043880 A1 | 2/2008 | Matsushita et al. |
| 2008/0045260 A1* | 2/2008 | Muharemovic et al. ...... 455/522 |
| 2008/0056181 A1 | 3/2008 | Imamura et al. |
| 2008/0062956 A1* | 3/2008 | Kuroda et al. ................. 370/348 |
| 2008/0117833 A1 | 5/2008 | Borran et al. |
| 2008/0117849 A1 | 5/2008 | Borran et al. |
| 2008/0165675 A1 | 7/2008 | Yang et al. |
| 2008/0166976 A1* | 7/2008 | Rao .................. 455/69 |
| 2008/0214121 A1 | 9/2008 | Sutivong et al. |
| 2008/0267067 A1* | 10/2008 | Salazar et al. ................ 370/235 |
| 2008/0291856 A1 | 11/2008 | Li et al. |
| 2009/0023466 A1 | 1/2009 | Sutivong et al. |
| 2009/0082052 A1 | 3/2009 | Bhushan et al. |
| 2009/0109939 A1 | 4/2009 | Bhushan et al. |
| 2009/0117931 A1* | 5/2009 | Shin et al. ..................... 455/522 |
| 2010/0027451 A1 | 2/2010 | Khandekar et al. |
| 2010/0061243 A1* | 3/2010 | Yi et al. ........................ 370/235 |
| 2011/0105111 A1* | 5/2011 | Plestid et al. ............. 455/422.1 |
| 2011/0282999 A1 | 11/2011 | Teague et al. |
| 2011/0296279 A1 | 12/2011 | Sutivong et al. |
| 2012/0083302 A1 | 4/2012 | Borran et al. |

FOREIGN PATENT DOCUMENTS

| | | |
|---|---|---|
| CL | 199500144 | 12/1995 |
| CL | 199701119 | 3/1998 |
| CL | 199800442 | 11/1998 |
| CL | 41883 | 8/2003 |
| CL | 33582005 | 12/2006 |
| CL | 04992006 | 2/2007 |
| CL | 05752006 | 2/2007 |
| CN | 1190848 A | 8/1998 |
| CN | 1250342 A | 4/2000 |
| EP | 0668662 A1 | 8/1995 |
| EP | 0673125 A1 | 9/1995 |
| EP | 0767548 | 4/1997 |
| EP | 0889663 A1 | 1/1999 |
| EP | 0955736 A2 | 11/1999 |
| EP | 715423 B1 | 10/2002 |
| EP | 1315310 A2 | 5/2003 |
| EP | 1320276 A2 | 6/2003 |
| EP | 1515475 A1 | 3/2005 |
| GB | 2378858 A | 2/2003 |
| JP | 2000040999 A | 2/2000 |
| JP | 20005022181 T | 2/2000 |
| JP | 2000504529 | 4/2000 |
| JP | 2001044926 | 2/2001 |
| JP | 2001274748 | 10/2001 |
| JP | 2001285193 | 10/2001 |
| JP | 2001519618 T | 10/2001 |
| JP | 2001358649 | 12/2001 |
| JP | 2002026747 A | 1/2002 |
| JP | 2002501353 A | 1/2002 |
| JP | 2002506334 | 2/2002 |
| JP | 2002077985 A | 3/2002 |
| JP | 2003032218 A | 1/2003 |
| JP | 2003505973 | 2/2003 |
| JP | 2003318818 A | 11/2003 |
| JP | 2004502323 | 1/2004 |
| JP | 2004503126 A | 1/2004 |
| JP | 2004064142 A | 2/2004 |
| JP | 2004080340 A | 3/2004 |
| JP | 2004104293 | 4/2004 |
| JP | 2004214914 A | 7/2004 |
| JP | 2004253899 A | 9/2004 |
| JP | 2004260467 A2 | 9/2004 |
| JP | 2004533188 | 10/2004 |
| JP | 2005501444 A | 1/2005 |
| JP | 2005502218 A | 1/2005 |
| JP | 2005505954 A | 2/2005 |
| JP | 2005065182 A | 3/2005 |
| JP | 2005348433 A | 12/2005 |
| JP | 2005537691 | 12/2005 |
| JP | 2005538650 | 12/2005 |
| JP | 2007518361 A | 7/2007 |
| JP | 2008503925 | 2/2008 |
| JP | 2008526136 A | 7/2008 |
| JP | 2008533924 | 8/2008 |
| JP | 2010200474 | 9/2010 |
| KR | 100262027 B1 | 7/2000 |
| KR | 200228664 | 4/2002 |
| KR | 20030004985 A | 1/2003 |
| KR | 20030024442 | 3/2003 |
| KR | 200427165 | 4/2004 |
| KR | 20040088982 A | 10/2004 |
| RU | 2001531 C1 | 10/1993 |
| RU | 2120183 C1 | 10/1998 |
| RU | 2163053 C2 | 2/2001 |
| RU | 2198465 C2 | 2/2003 |
| RU | 2214680 C2 | 10/2003 |
| RU | 2214690 C2 | 10/2003 |
| RU | 2277762 | 6/2006 |
| RU | 2005138862 | 6/2006 |
| TW | 462155 B | 11/2001 |
| TW | 508910 B | 11/2002 |
| TW | 546927 B | 8/2003 |
| TW | 584996 B | 4/2004 |
| WO | WO9427381 A1 | 11/1994 |
| WO | WO9824198 | 6/1998 |
| WO | WO983005 A1 | 7/1998 |
| WO | WO9918689 | 4/1999 |
| WO | WO9935865 A1 | 7/1999 |
| WO | WO9945736 A1 | 9/1999 |
| WO | WO0014900 A1 | 3/2000 |
| WO | WO0055976 A2 | 9/2000 |
| WO | WO0108325 | 2/2001 |
| WO | WO0117158 | 3/2001 |
| WO | WO0120808 A2 | 3/2001 |
| WO | WO0178291 A2 | 10/2001 |
| WO | WO0182504 A1 | 11/2001 |
| WO | WO0232179 A1 | 4/2002 |
| WO | WO0239609 A1 | 5/2002 |
| WO | WO0249305 | 6/2002 |
| WO | WO02091597 | 11/2002 |
| WO | WO03034645 A1 | 4/2003 |
| WO | WO2003085878 A1 | 10/2003 |
| WO | WO2004025869 A2 | 3/2004 |
| WO | WO2004025986 A2 | 3/2004 |
| WO | WO2004032548 A1 | 4/2004 |
| WO | WO2004042954 A1 | 5/2004 |
| WO | WO2004059874 A1 | 7/2004 |
| WO | WO2004104530 | 12/2004 |

| WO | WO2004105294 | A2 | 12/2004 |
| WO | WO2005034545 | A1 | 4/2005 |
| WO | 2006007318 | | 1/2006 |
| WO | WO2006012376 | A1 | 2/2006 |
| WO | 2007014037 | | 2/2007 |
| WO | WO2007050846 | A1 | 5/2007 |
| WO | WO2007112141 | A2 | 10/2007 |
| WO | 2007146891 | | 12/2007 |
| WO | WO2008030823 | | 3/2008 |

OTHER PUBLICATIONS

International Search Report-PCT/US2007/077672, International Searching Authority-European Patent Office-Jun. 27, 2008.
Written Opinion-PCT/US2007/077672, International Searching Authority-European Patent Office-Jun. 27, 2008.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
Elmusrati, et al., "Multi-Objective Distributed Power Control Algorithm," Vehicular Technology Conference Proceedings VTC 2002 Fall IEEE 56th, vol. 2, pp. 812-816.
Hosein, "Interference Management of OFDMA Uplinks," IEEE 65th Vehicular Technology Conference, VTC2007-Spring, pp. 2435-2439, Apr. 22-25, 2007.
Nevdyaev, L.M., "Telecommunication Technologies," Moscow, Business and Communications, 2002, p. 140.
TIA/EIA/IS-95 "Mobile Station-Base Station Compatibility Standard for Dual-Mode Wideband Spread Spectrum Cellular System" Jul. 1993.
Tomcik, T.: "QTDD Performance Report 2", IEEE C802.20-05/88, IEEE 802.20 Working Group on Mobile Broadband Wireless Access, http://ieee802.org/20/, pp. 1-56, XP002386798 (Nov. 15, 2005).
Bowie, Song et al., "Iterative Joint Channel Estimation and Signal Detection in MIMO OFDM Systems," Institute of Image Communication and Information Processing, Shanghai Jiao Tong University Shanghai, China, 2005, pp. 39-43.
International Preliminary Report on Patent Ability PCT/US06/042060, International Search Authority, The International Bureau of WITO, Geneva, Switzerland, Apr. 29, 2008.
International Search Report, PCT/US06/042060, International Search Authority, European Patent Office, Jun. 27, 2007.
Roberto Padovani, "The Application of Spread Spectrum to PCS has Become a Reality Reverse Link Performance of IS-95 Based Cellular Systems," IEEE Personal Communication, US, IEEE Communications Society, vol. 1, No. 3, Jul. 1, 1994, pp. 28-34.
Shao, L. et al.; "Downlink multicell MIMO-OFDM: An architecture for next generation wireless networks," in Proc. IEEE Wireless Commun. and Networking Conf. (WCNC), vol. 2, Santa Clara, USA, Mar. 2005, pp. 1120-1125.
U.S. Appl. No. 60/516,557, filed on Oct. 30, 2003 by Ji. et al., 6 pages.
Written Opinion, PCT/US06/042060, International Search Authority, European Patent Office, Jun. 27, 2007.
Taiwan Search Report—TW096133609—TIPO—May 21, 2011.
Taiwan Search Report—TW094120509—TIPO—Jul. 10, 2011.
European Search Report—EP08008762—Search Authority—Munich—Jun. 22, 2011.
Tanaka et al., Fast initial acquisition of transmitter power for the reverse link DS/CDMA cellular systems, May 1998, IEEE Vehicular Technology Conference, p. 2436-2440.
Qualcomm Incorporated: QFDD Technology Overview Presentation, IEEE 802.20 Working Group on Mobile Broadband Wireless Access, C802.20-05-59, Nov. 2005, XP002518168, Retrieved from Internet: URL:http://grouper.ieee.org/groups/802/20/Contributions.html, pp. 45-47, Oct. 28, 2005.
Tomcik, Jim: "QFDD and QTDD: Technology Overview", IEEE 802.20 Working Group on Mobile Broadband Wireless Access, XP002480491, Oct. 28, 2005, pp. 1, 61-106, Retrieved from Internet: URL: http://grouper.iee.org/groups/802/20/Contributions.html.
C30-20060327-023, "QUALCOMM Proposal for 3GPP2 Air Interface Evolution Phase 2", Dallas, TX, Mar. 2006.
European Search Report—EP11009023—Search Authority—Berlin—Oct. 22, 2012.
European Search Report—EP11009024—Search Authority—Berlin—Oct. 22, 2012.

\* cited by examiner

METHOD AND APPARATUS FOR ADJUSTMENTS FOR DELTA-BASED POWER CONTROL IN WIRELESS COMMUNICATION SYSTEMS

CROSS-REFERENCE

This application claims the benefit of U.S. Provisional Application Ser. No. 60/843,365, filed Sep. 8, 2006, entitled "METHODS AND APPARATUS FOR ADJUSTMENTS FOR DELTA-BASED POWER CONTROL IN WIRELESS COMMUNICATION SYSTEMS," and U.S. Provisional Application Ser. No. 60/862,765, filed Oct. 24, 2006, entitled "METHODS AND APPARATUS FOR ADJUSTMENTS FOR DELTA-BASED POWER CONTROL IN WIRELESS COMMUNICATION SYSTEMS," the entireties of which are incorporated herein by reference.

BACKGROUND

I. Field

The present disclosure relates generally to wireless communications, and more specifically to techniques for power and interference control in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless multiple-access communication system can simultaneously support communication for multiple wireless terminals. In such a system, each terminal can communicate with one or more sectors via transmissions on the forward and reverse links. The forward link (or downlink) refers to the communication link from the sectors to the terminals, and the reverse link (or uplink) refers to the communication link from the terminals to the sectors.

Multiple terminals can simultaneously transmit on the reverse link by multiplexing their transmissions to be orthogonal to one another in the time, frequency, and/or code domain. If complete orthogonality between transmissions is achieved, transmissions from each terminal will not interfere with transmissions from other terminals at a receiving sector. However, complete orthogonality among transmissions from different terminals is often not realized due to channel conditions, receiver imperfections, and other factors. As a result, terminals often cause some amount of interference to other terminals communicating with the same sector. Furthermore, because transmissions from terminals communicating with different sectors are typically not orthogonal to one another, each terminal may also cause interference to terminals communicating with nearby sectors. This interference, denoted as other sector interference (OSI), results in a decrease in performance at each terminal in the system. Accordingly, there is a need in the art for effective techniques to mitigate the effects of interference in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing techniques for controlling reverse link transmission resources to manage observed interference in a wireless communication system. More particularly, a terminal in a wireless communication system can adjust resources used for reverse link communication with an access point using one or more delta-based power control techniques. For example, a terminal can utilize one or more delta-based power control techniques described herein when the terminal engages in transmission on the reverse link with a serving access point after a predetermined period of silence or after receiving indications of interference from neighboring access points. A terminal can first compute a delta value through open-loop projection, based on which transmission resources such as bandwidth and/or transmit power can be increased or decreased to manage interference caused by the terminal. In addition, the delta value, other feedback from the terminal, and/or indications of interference caused by the terminal can be communicated as feedback to the serving access point to allow the access point to further assign transmission resources for the terminal.

According to an aspect, a method for power control in a wireless communication system is described herein. The method can comprise determining whether a prior transmission occurred before a predetermined threshold. In addition, the method can include computing one or more of an open loop delta value, an open loop delta value based on an assigned bandwidth, and a bandwidth based on a delta value. Further, the method can comprise adjusting one or more parameters to be used for a future transmission based at least in part on the computed values.

Another aspect relates to a wireless communications apparatus that can comprise a memory that stores data relating to a time at which a prior transmission was conducted and a threshold. The wireless communications apparatus can further include a processor configured to determine whether the prior transmission occurred earlier than the threshold and, upon a positive determination, to compute one or more of an open loop delta value, an open loop delta value based on an assigned bandwidth, and a bandwidth based on a delta value and to adjust a parameter to be used for transmissions based on the computed values.

Yet another aspect relates to an apparatus that facilitates reverse link power control in a wireless communication system. The apparatus can comprise means for conducting a transmission to a serving sector on a reverse link. In addition, the apparatus can comprise means for determining whether the transmission occurred outside of a timing threshold. Further, the apparatus can include means for computing an open loop delta value, an open loop delta value, or a bandwidth based on a delta value upon a positive determination. The apparatus can also include means for means for adjusting a parameter utilized for conducting transmissions to the serving sector based on the computed value.

Still another aspect relates to a computer-readable medium that can comprise code for causing a computer to conduct a reverse link transmission to a base station after a predetermined timing threshold. The computer-readable medium can further include code for causing a computer to compute one or more open loop delta-based parameters. In addition, the computer-readable medium can include code for causing a computer to adjust one or more of a bandwidth and a transmit power used for future transmissions to the base station based at least in part on the computed open loop delta-based parameters.

According to another aspect, an integrated circuit is described herein that can execute computer-executable instructions for reverse link power control and interference management in a wireless communication system. These instructions can comprise conducting a reverse link transmission to a serving sector. Additionally, the instructions can comprise determining whether an OSI indication corresponding to the reverse link transmission has been received. Further, the instructions can include adjusting one or more parameters to be used for future reverse link transmissions based at least in part on whether an OSI indication has been received.

According to yet another aspect, a method for conducting reverse link power control in a wireless communication system is described herein. The method can comprise receiving one or more of a communication request and power control feedback information from a terminal. In addition, the method can include receiving a report of OSI activity caused by the terminal. Further, the method can comprise assigning a parameter to be used for communication by the terminal based on the received information and the received report of OSI activity.

Another aspect relates to a wireless communications apparatus that can comprise a memory that stores data relating to a report of OSI activity caused by an access terminal and power control feedback information received from the access terminal. In addition, the wireless communications apparatus can comprise a processor configured to generate an assignment for transmission resources based on at least one of the report of OSI activity and the power control feedback and to communicate the assignment to the access terminal.

Yet another aspect relates to an apparatus that facilitates reverse link power control and interference management in a wireless communication system. The apparatus can comprise means for receiving power control information and OSI information corresponding to a wireless terminal. Further, the apparatus can include means for assigning one or more of a transmit power and a bandwidth to the wireless terminal based at least in part on the received information. The apparatus can additionally include means for communicating an assigned transmit power or an assigned bandwidth to the wireless terminal.

Still another aspect relates to a computer-readable medium that can include code for causing a computer to receive a report of OSI activity caused by a terminal. Further, the computer-readable medium can include code for causing a computer to generate an assignment for one or more of a transmit power or a bandwidth to be utilized by the terminal based at least in part on the received report. In addition, the computer-readable medium can further include code for causing a computer to communicate the assignment to the terminal.

An additional aspect described herein relates to an integrated circuit that can execute computer-executable instructions for reverse link power and interference control in a wireless communication system. These instructions can comprise receiving feedback from a terminal, the feedback comprising a report of OSI indications received by the terminal. Further, the instructions can comprise assigning transmission resources to the terminal based on the received feedback. In addition, the instructions can include communicating the assigned transmission resources to the terminal.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
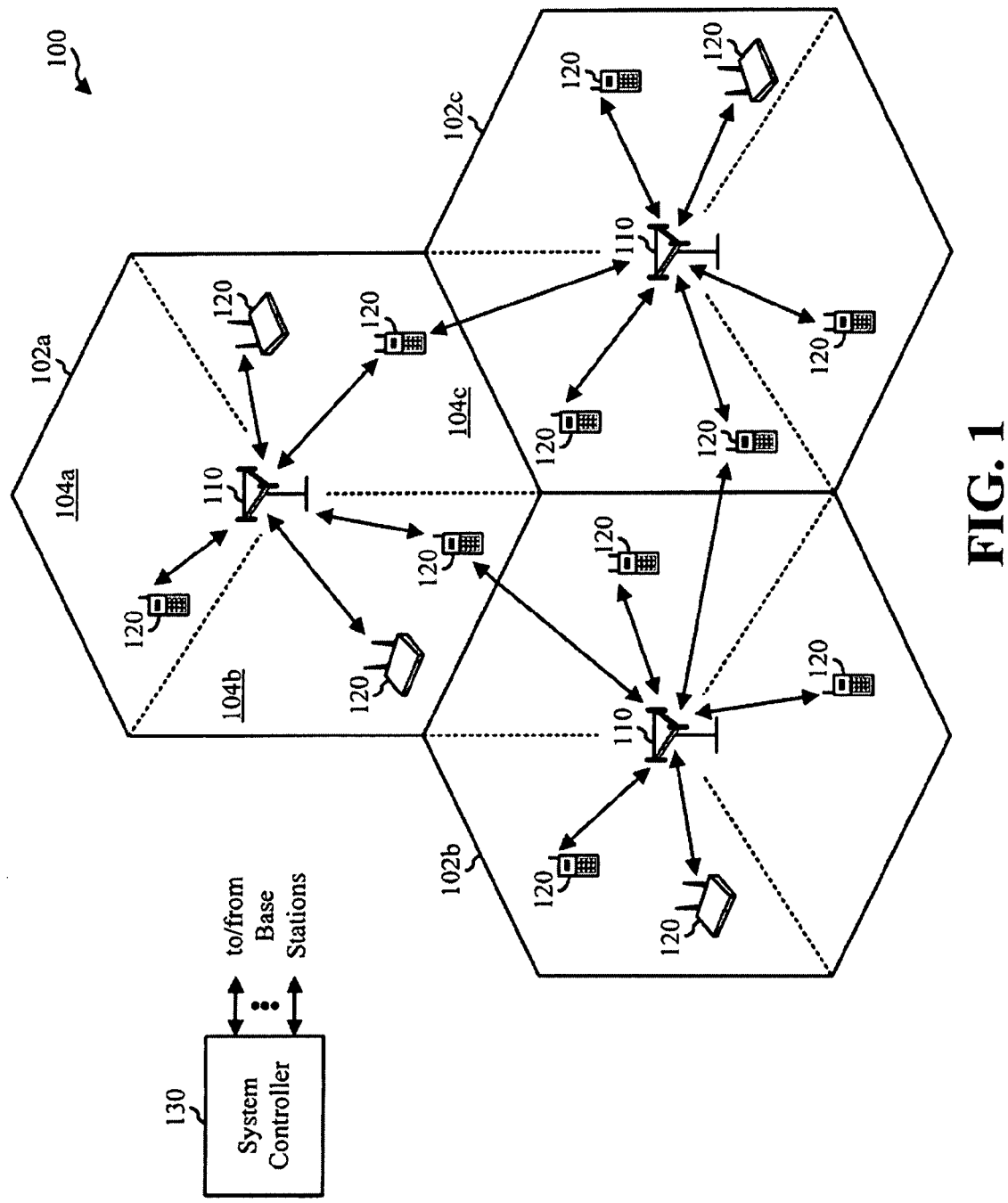
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution.

For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102a-c. As used herein and generally in the art, the term "cell" can refer to a base station 110 and/or its coverage area 102 depending on the context in which the term is used.

To improve system capacity, the coverage area 102a corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In one example, sectors 104 in a cell 102a can be formed by groups of antennas (not shown) at base station 110, where each group of antennas is responsible for communication with terminals 120 in a portion of the cell 102. For example, a base station 110 serving cell 102a may have a first antenna group corresponding to sector 104a, a second antenna group corresponding to sector 104b, and a third antenna group corresponding to sector 104c. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell. As further used herein, a "serving" access point is one with which a given terminal communicates, and a "neighbor" access point is one with which a given terminal is not in communication. While the following description generally relates to a system in which each terminal communicates with one serving access point for simplicity, it should be appreciated that terminals can communicate with any number of serving access points.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In one example, system controller 130 can additionally contain one or more connections to multiple networks. These networks may include the Internet, other packet based networks, and/or circuit switched voice networks that may provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler may reside in each individual cell 102, each sector 104, or a combination thereof.

In one example, system 100 may utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with one aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include power amplifier (PA) headroom feedback in order to allow the scheduler to estimate a supportable reverse link peak rate for a terminal 120 from which such feedback is received and to allocate system bandwidth accordingly.

In accordance with another aspect, base stations 110 can broadcast or otherwise transmit interference indications to terminals 120. In one example, a base station 110 can broadcast other sector interference (OSI) messages and/or other similar information corresponding to whether the base station 110 is experiencing excessive interference. This information can be broadcast via a dedicated OSI channel and/or another suitable channel. Once broadcast, OSI messages can then be used by terminals 120 to adjust resources used for transmission on the reverse link. By way of specific example, these resources can include a power spectral density (PSD) parameter that is based on a difference between a data channel PSD, a control channel PSD, and a long-term average path loss difference between a serving base station 120 and one or more of the strongest nearby base stations 120. In another specific example, reverse link interference control can be used by system 100 to guarantee minimum system stability and quality of service (QoS) parameters for the system. More particularly, decoding error probability of reverse link (RL) acknowledgement messages can be used by system 100 as an error floor for all forward link transmissions. By employing interference control on the RL, system 100 can facilitate power efficient transmission of control and QoS traffic and/or other traffic with stringent error requirements.

Figure 2A:
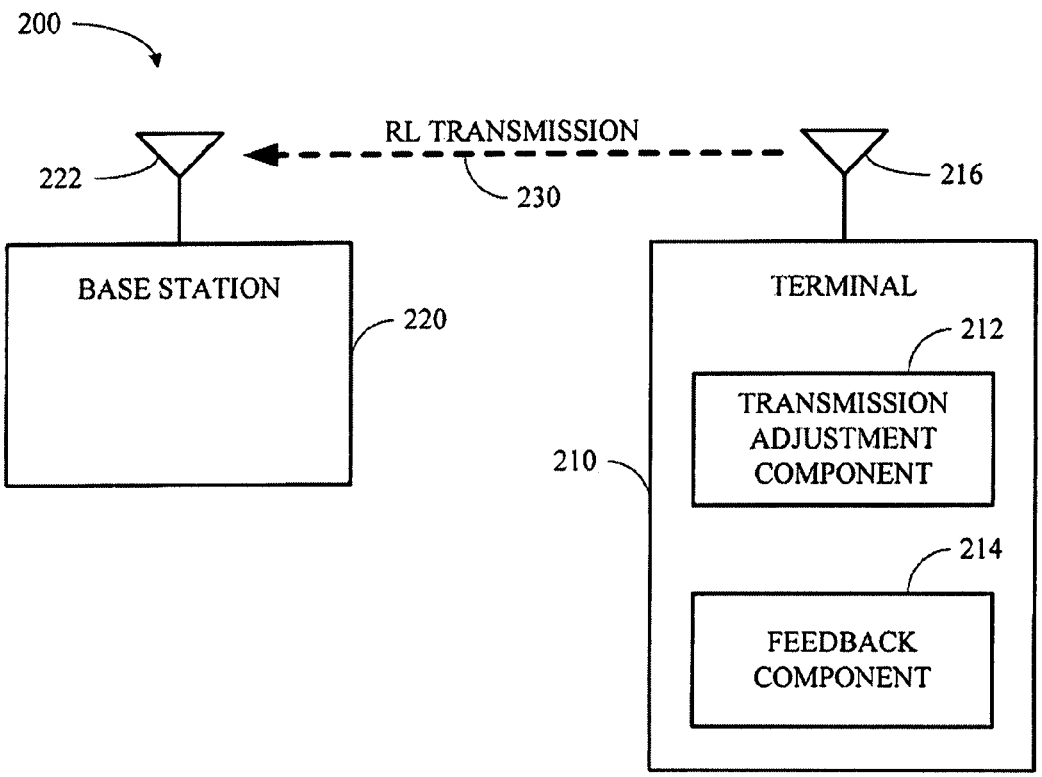
FIGS. 2A-2B illustrate operation of an example system for delta-based power control in a wireless communication system in accordance with various aspects.
Figure 2B:
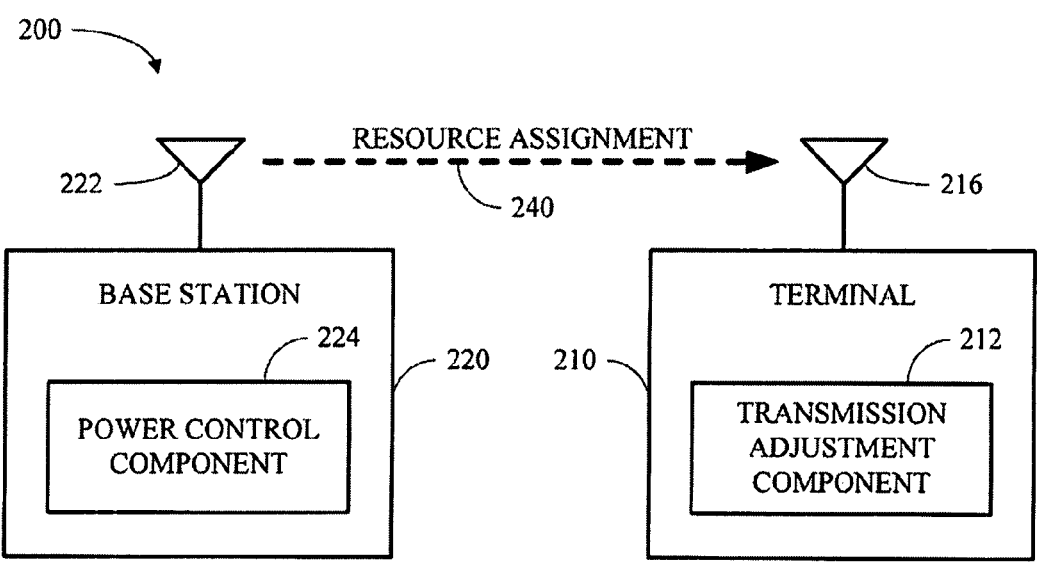

FIGS. 2A-2B are block diagrams that illustrate operation of an example system 200 for delta-based power control in a wireless communication system. In one example, system 200 includes a terminal 210 that can communicate with a base station 220 on the forward and reverse links via one or more antennas 216 at terminal 210 and one or more antennas 222 at base station 220. It should be appreciated that base station 220 can provide coverage for a cell (e.g., a cell 102) or an area within a cell (e.g., a sector 104). In addition, while only one terminal 210 and base station 220 are illustrated in system 200 for brevity, system 200 can include any number of base stations and/or terminals. For example, system 200 can include one or more neighbor base stations, which can provide coverage for respective geographic areas that can include all, part, or none of an area covered by base station 220.

In accordance with one aspect, a terminal 210 and a base station 220 can communicate to control the amount of transmit power or other resources used by the terminal 210 in communicating with the base station 220 via one or more power control techniques. In one example, terminal 210 can locally conduct power control for communication with base station 220 via a transmission adjustment component 212. Alternatively, power control techniques can be performed cooperatively between terminal 210 and base station 220. Example power control techniques that can be performed by terminal 210 and base station 220 are described in further detail infra.

In accordance with another aspect, power control techniques utilized by entities in system 200 can additionally take into account interference present in system 200. For example, in a multiple access wireless communication system, multiple terminals 210 may simultaneously conduct uplink transmission by multiplexing their transmissions to be orthogonal to one another in the time, frequency, and/or code domain. However, complete orthogonality between transmissions from different terminals 210 is often not achieved due to channel conditions, receiver imperfections, and other factors. As a result, terminals 210 in system 200 will often cause interference to other terminals 210 communicating with a common sector. Furthermore, because transmissions from terminals 210 communicating with different sectors are typically not orthogonal to one another, each terminal 210 may also cause interference to terminals 210 communicating with nearby sectors. As a result, the performance of terminals 210 in system 200 can be degraded by the interference caused by other terminals 210 in system 200.

Accordingly, an amount of inter-cell interference caused by a given terminal 210 can be determined by the transmit power level used by the terminal 210 and the location of the terminal 210 relative to neighbor sectors in system 200. Based on this, power control can be performed in system 200 such that each terminal 210 is allowed to transmit at a power level that is appropriate while keeping intra-cell and inter-cell interference to within acceptable levels. For example, a terminal 210 located closer to its serving base station 220 may be allowed to transmit at a higher power level since the terminal will likely cause less interference to other base stations in system 200. Conversely, a terminal 210 located farther away from base station 220 and toward the edge of the coverage area of base station 220 may be restricted to a lower transmit power level since the terminal may cause more interference to neighboring base stations. By controlling transmit power in this manner, system 200 can reduce the total interference observed by base stations 220 while allowing "qualified" terminals 210 to achieve higher SNRs and thus higher data rates.

Interference-based power control can be performed in system 200 using various techniques in order to increase overall performance of entities therein. In one such technique, transmit Power Spectral Density (PSD) for a data channel, or another suitable channel having a power offset based upon another channel, can be expressed for a given terminal 210 as follows:

$$P_{dch}(n)=P_{ref}(n)+\Delta P(n), \quad (1)$$

where $P_{dch}(n)$ is the transmit PSD for the data channel for an update interval n, $P_{ref}(n)$ is a reference PSD level for update interval n, and $\Delta P(n)$ is a transmit PSD delta for update interval n. The PSD levels $P_{dch}(n)$ and $P_{ref}(n)$ and the transmit power delta $\Delta P(n)$ can be given in units of decibels (e.g., dBm/Hz for $P_{dch}(n)$ and $P_{ref}(n)$, and dB for $\Delta P(n)$), although other units can be utilized. Further, it should be appreciated that calculations other than that given by Equation (1) can also be utilized. In one example, the reference PSD level $P_{ref}(n)$ corresponds to the amount of transmit PSD needed to achieve a target signal-to-noise ratio (SNR) or erasure rate for a designated transmission. The transmission can be provided by a fixed channel such as, for example, a channel quality feedback channel or a request channel. If a reference power level is capable of achieving the corresponding target SNR or erasure rate, then the received SNR for the other channel may be estimated as follows:

$$SNR_{dch}(n)=SNR_{target}+\Delta P(n). \quad (2)$$

In one example, a data channel and a corresponding control channel utilized by entities in system 200 can have similar interference statistics. This can occur, for example, when control and data channels from different sectors interfere with one another. In such a case, the interference offset for the channels may be calculated at terminal 210. Alternatively, the interference offset between the control channels and data channels can be broadcasted by one or more base stations 220.

In another example, a transmit PSD for a data channel can be set based on factors such as an amount of inter-sector interference terminal 210 is potentially causing to other terminals in neighboring sectors (e.g., sectors 104), an amount of intra-sector interference terminal 210 is potentially causing to other terminals in the same sector, a maximum allowable transmit power level for terminal 210, a period of time between transmissions by terminal 210, and/or other factors.

With reference to FIG. 2A, a reverse link (RL) transmission 230 between terminal 210 and base station 220 in system 200 is illustrated. In one example, resources used by terminal 210 for the reverse link transmission, such as power and/or bandwidth, can be adjusted by a transmission adjustment component 212 at terminal 210. In another example, transmission adjustment component 212 can adjust resources used by terminal 210 for a reverse link transmission by employing one or more power control techniques that can take interference observed by entities in system 200 and/or other factors into account. One example of a power control technique that transmission adjustment component 212 can utilize is a delta-based power control technique, in which the transmit power of terminal 210 can be adjusted based on a delta offset value. By way of specific, non-limiting example, a delta offset value can correspond to a transmit power difference between a pilot channel and a traffic channel utilized by terminal 210 and/or any other suitable metric.

In accordance with one aspect, terminal 210 can further include a feedback component 214 to communicate information for power control in the reverse link transmission to base station 220 to facilitate cooperative power control of terminal 210. For example, feedback component 214 can send a transmit PSD delta computed by transmission adjustment component 212 and a maximum number of subcarriers or subbands that terminal 210 can support at the current transmit PSD delta, $N_{sb,max}(n)$, to base station 220. In addition, desired quality of service (QoS) and buffer size parameters can also be transmitted to base station 220 by feedback component 214. To reduce the amount of required signaling, feedback component 214 can transmit $\Delta P(n)$ and $N_{sb,max}(n)$ at a subset of update intervals via in-band signaling on a data channel and/or by other means. It should be appreciated that a low transmit PSD delta corresponding to terminal 210 does not mean that terminal 210 is not using all of the resources available to it. Instead, terminal 210 can be given more subcarriers or subbands for transmission in order to use all its available transmit power. Further, feedback component 214 can provide information for power control to base station 220 in a variety of ways. For example, such information can be provided to base station 220 via a MAC header of a packet, such as a control channel packet; in a separate physical channel, such as a channel for interference or power control feedback; as part of channel state information feedback (e.g., as one or more bits of channel state information); and/or by other suitable means.

In accordance with another aspect, while delta-based power control can be very effective in adjusting the transmit powers of terminal 210 and controlling the amount of interference caused at base stations 220 in system 200 during continuous transmission, it may not provide an initial set point for the transmit power or PSD of terminal 210. Rather, the initial set point may be a PSD value after a period of inactivity (or a "silence period"). If system 200 is partially loaded such that terminal 210 is a single bursty interferer to a neighboring sector, a delta value for terminal 210 may increase to a maximum delta value during any silence period due to the fact that the neighboring sector does not experience any interference during this period and does not transmit indications for large OSI (other sector interference) values. In this case, the bursty transmissions of terminal 210 can cause a significant amount of interference to the neighboring sector at the beginning of each burst, before the delta-based power control finds a chance to adjust the delta value of terminal 210 to an appropriate level. This, in turn, can lead to packet errors or missed reverse link acknowledgement messages in the neighboring sector. Therefore, in one example, transmission adjustment component 212 can be configured to adjust the delta value at the beginning of each burst initiated by terminal 210. By performing initial adjustments to resources utilized by terminal 210 for transmission, transmission adjustment component 212 can act to limit performance loss due to large increases in interference.

In one example, terminal 210 can begin a transmission after a silence period at a minimum delta value and allow transmission adjustment component 212 to adjust the delta value for subsequent transmissions. However, in some instances, such as when terminal 210 transmits bursty traffic with small packets to base station 220, this may result in an unnecessarily low throughput for the bursty traffic. Alternatively, in order to limit the amount of interference at the beginning of each burst, transmission adjustment component 212 can make open-loop adjustments to the delta value and/or a maximum requested bandwidth value $W_{max}$. By way of example, transmission adjustment component 212 can determine whether a prior transmission by terminal 210 occurred later than a predetermined threshold, which can be based on a number of frames, superframes, a time period, number of assignment messages, number of erasure measurements, and/or other metrics. If so, transmission adjustment component 212 can then compute an open-loop delta value, an open-loop delta value based on bandwidth assigned for transmission, bandwidth assigned for transmission based on a delta value, and/or other parameters. After computing appropriate parameters, adjustments can be made to bandwidth and/or transmit power used by terminal 210 based on the computation.

In one example, transmission adjustment component 212 can be restricted to make open-loop adjustments only at the beginning of each burst, e.g., after it is determined that a threshold has passed. Alternatively, transmission adjustment component 212 may facilitate open-loop adjustments at other times, such as at frames or portions of frames corresponding to interlaces on which terminal 210 is not scheduled, to provide maximum values for a fast delta value to prevent the delta value from becoming too large due to little OSI indication activity.

Based on feedback provided to base station 220 by feedback component 214 at terminal 210 as illustrated by FIG. 2A and/or other information, base station 220 can generate a resource assignment 240 for terminal 210 and communicate resource assignment 240 to terminal 210 as illustrated in FIG. 2B. In one example, a transmit power for terminal 210 can be assigned by a power control component 224 at serving sector 220. Power control component 224 can receive feedback from feedback component 214 at terminal 210, interference indications from terminal 210 and/or other base stations in system 200, and/or other parameters for use in generating a resource assignment for terminal 210. Parameters utilized by power control component 224 can be received together as a common communication or in separate communications. Once a resource assignment 240 is determined by power control component 224, the assignment can be communicated by base station 220 back to terminal 210, whereupon transmission adjustment component 212 can adjust transmission resources for terminal 210 in accordance with the assignment.

In one specific example, power control component 224 can calculate $\Delta P(n)$ and/or other parameters utilized for generating a resource assignment 240 for terminal 210 based upon a reference PSD level $P_{ref}(n)$, the power of signals received on reverse link channel quality indicator and/or request channels from terminal 210, and/or other factors. In such an example, carrier-to-interference offset can be determined along with a value for interference minus rise over thermal noise power (IoT-RoT). These values can then be used to offset the power of the signals received from reverse link channel quality indicators and/or request channels from terminal 210 and/or transmitted as power control commands back to terminal 210. In one example, carrier-to-interference offset can be determined as a function of intra-sector interference and other terminals 210 in a sector served by base station 220. Further, IoT values can be calculated for base station 220 and/or received from other access points or sectors in system 200 via broadcasts from said access points or sectors and/or via backhaul. Additionally and/or alternatively, RoT values may be calculated by power control component 224 as known. In another example, offsets used by power control component 224 can be based on steps, other variations, and/or system-dependent delta factors.

In another example, total interference power received over the bandwidth of system 200 can be used by power control component 224 as an interference control metric. The total interference power can be used to determine a maximum per-user interference target, which can then be used to schedule terminal 210 for reverse link transmission in terms of bandwidth, timing, and/or other parameters. The per-user interference target can be set, for example, to be a small fraction of total interference power for systems with interference vulnerable deployment. By way of non-limiting example, such a target can be utilized in a micro cell deployment since an individual terminal on a cell edge in such a deployment may have enough power to overwhelm a cell over a bandwidth of 5 or 10 MHz. In addition, such a target can be utilized in connection with cells used for communicating traffic having a significantly low latency that is susceptible to large IoT variations.

In accordance with another aspect, a resource assignment 240 determined by power control component 224 and received by terminal 210 may not match open-loop requirements for terminal 210 computed by transmission adjustment component 212. For example, an assigned bandwidth may be too large for use by terminal 210 based on a maximum bandwidth corresponding to minimum delta values computed by transmission adjustment component 212. In such a case, transmission adjustment component 212 can recover from an assignment mismatch in various ways. For example, transmission adjustment component 212 can instruct terminal 210 to suspend transmission and lose the assignment received from base station 220. As another example, the minimum delta value can be utilized by transmission adjustment component 212 to determine a new maximum bandwidth and/or delta value, which can then be communicated to base station 220 in order to receive a new assignment. Additionally and/or alternatively, if terminal 210 is capable of reverse rate indication (RRI) and/or multiple hypothesis decoding, terminal 210 can change a packet format used for communication with base station 220 in order to effectively utilize the resource assignment. As an additional example, transmission adjustment component 212 can discard the resource assignment and instruct terminal 210 to either suspend transmission or extend a hybrid automatic request (HARQ) retransmission to account for the discarded assignment.

Figure 3A:
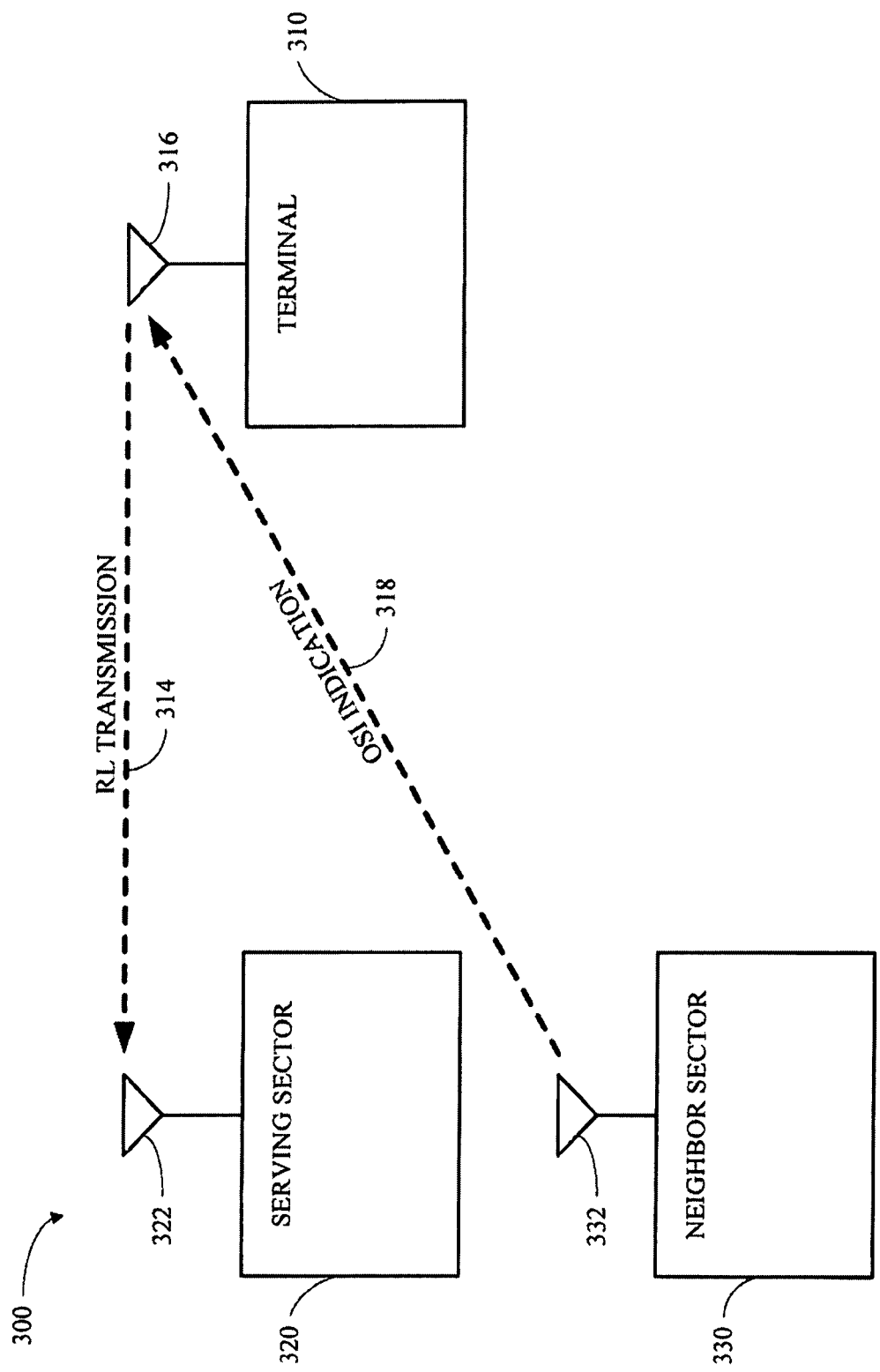
FIGS. 3A-3B illustrate operation of an example system for reverse link power control and interference management in a wireless communication system in accordance with various aspects.
Figure 3B:
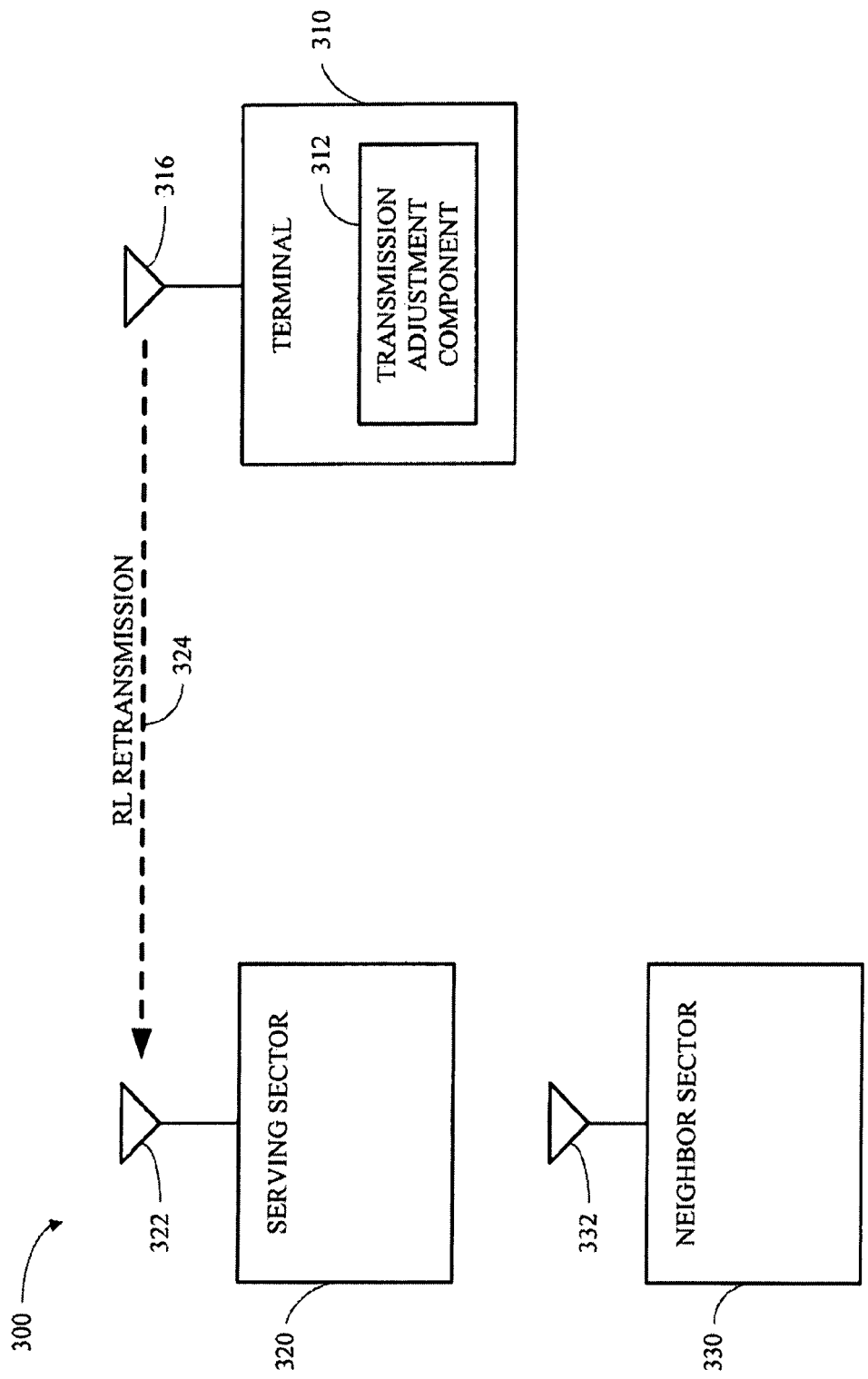

FIGS. 3A-3B are block diagrams that illustrate operation of an example system 300 for reverse link power control and interference management in a wireless communication system. In one example, system 300 includes a terminal 310 in communication with a serving sector 320 on the forward and reverse links via respective antennas 316 and 322. System 300 can also include one or more neighbor sectors 330 not in direct communication with terminal 310. For example, neighbor sector 330 can provide coverage for a geographic area bordering an area for which serving sector 320 provides coverage. While only one terminal 310 and two sectors 320 and 330 are illustrated in system 300, it should be appreciated that system 300 can include any number of terminals and/or sectors.

In accordance with one aspect, terminal 310 can utilize one or more delta-based power control algorithms to control resources used by terminal 310 for communication with serving sector 320 on the reverse link. Terminal 310 can employ such techniques independently, or alternatively terminal 310 can perform delta-based power control in cooperation with serving sector 320. In one example, power control techniques utilized by terminal 310 and serving sector 320 can be based on a level of interference caused by terminal 310 at serving sector 320 and/or other sectors such as neighbor sector 330. By utilizing interference as a factor in power control for terminal 310, such techniques can facilitate more optimal overall performance in system 300 than similar techniques that do not take interference into account.

With reference to FIG. 3A, a reverse link transmission 314 from terminal 310 to serving sector 320 and a subsequent other sector interference (OSI) indication 318 from neighbor sector 330 is illustrated. In accordance with one aspect, in the event that dominant interference sector 330 experiences interference subsequent to a reverse link transmission from terminal 310, dominant interference sector 330 can transmit one or more OSI indications 318 to terminal 310 on the forward link via one or more antennas 332. Terminal 310 can utilize OSI indications 318 received from dominant interference sector 330 to determine an amount of inter-sector interference terminal 310 is potentially causing in various manners. In one example, the amount of inter-sector interference caused by terminal 310 can be directly estimated at dominant interference sector 330 and/or other neighbor access points in system 300. These directly estimated values can then be sent to terminal 310 in order to allow terminal 310 to adjust its transmit power accordingly.

Alternatively, the amount of inter-sector interference caused by terminal 310 can be roughly estimated based on the total interference observed by dominant interference sector 330 and/or neighbor access points; channel gains for serving sector 320, dominant interference sector 330, and/or neighbor access points; and/or a transmit power level used by terminal 310. In one example, respective access points in system 300 can estimate a total or average currently observed amount of interference and broadcast these interference measurements for use by terminals in other sectors. By way of non-limiting example, a single other-sector interference (OSI) bit can be used by each access point to provide interference information. Accordingly, each access point may set its OSI bit (OSIB) as follows:

$$OSIB(N) = \begin{cases} \text{'1'}, & \text{if } IOT_{meas,m}(n) \geq IOT_{target}, \text{ and} \\ \text{'0'}, & \text{if } IOT_{meas,m}(n) < IOT_{target}, \end{cases} \quad (3)$$

where $IOT_{meas,m}(n)$ is the measured interference-over-thermal (IOT) value for an m-th sector at a time interval n and $IOT_{target}$ is a desired operating point for the sector. As used in Equation (3), IOT refers to a ratio of the total interference power observed by an access point to thermal noise power. Based on this, a specific operating point may be selected for the system and denoted as $IOT_{target}$. In one example, OSI can be quantized into multiple levels and accordingly comprise multiple bits. For example, an OSI indication can have two levels, such as $IOT_{MIN}$ and $IOT_{MAX}$. The levels can be configured such that, for example, if an observed IOT is between $IOT_{MIN}$ and $IOT_{MAX}$, then a terminal 310 can continue to use its current transmit power without adjustment. Alternatively, if the observed IOT is above or below the given levels, then transmit power can be accordingly adjusted upward or downward.

OSI indications 318 can be communicated by dominant interference sector in various manners. For example, OSI indications 318 communicated by dominant interference sector 330 can be regular OSI indications carried over forward link physical channels, such as a forward link OSI channel (F-OSICH). Regular OSI indications can be rate-limited to, for example, one transmission per superframe to account for required power and time-frequency resources of such indications. As another example, OSI indications 318 communicated by dominant interference sector 330 can be fast OSI indications carried over a forward link fast OSI channel (F-FOSICH) and/or another appropriate channel. Such indications can be used, for example, in scenarios where bursty traffic is transmitted by terminal 310 in order to enable more dynamic control of power levels. Additionally, OSI indications 318 communicated by dominant interference sector 330 can include indications of traffic interference over thermal noise power (IOT) and/or other interference offset parameters observed by dominant interference sector 330, which can be carried over a forward link physical channel such as a forward link IOT channel (F-IOTCH).

In accordance with another aspect, terminal 310 can additionally estimate channel gain or propagation path gain for access points that may receive a reverse link transmission 314 from terminal 310. The channel gain for each of the access points can be estimated by processing a pilot received from the access points on the forward link. In one example, a channel gain ratio between serving sector 320 and a neighbor access point such as dominant interference sector 330 can be utilized as a "relative distance" indicative of a distance to dominant interference sector 330 relative to a distance to serving sector 320. It can be observed that a channel gain ratio for a neighbor access point will generally decrease as terminal 310 moves toward a sector edge corresponding to serving sector 320 and generally increase as terminal 310 moves closer to serving sector 320. In addition, information regarding pilot carrier power over thermal noise power (pCoT) and/or other channel quality parameters can be communicated by sectors 320 and/or 330 to terminal 310 through a forward link pilot quality indicator channel (F-PQICH) and/or another suitable forward link physical channel.

Based on the presence or absence of an OSI indication from dominant interference sector 330 indicating interference caused by terminal 310 from a reverse link transmission to serving sector 320 as illustrated in FIG. 3A, terminal 310 can perform delta-based adjustments to resources utilized for the reverse link transmission and repeat the transmission with the adjusted resources as illustrated in FIG. 3B. In one example, terminal 310 can include a transmission adjustment component 312 for adjusting transmit power, bandwidth, and/or resources used for reverse link communication with serving sector 320. While transmission adjustment component 312 is illustrated in FIG. 3B as a component of terminal 310, it should be appreciated that serving sector 320 and/or another suitable network entity can also perform some or all of the calculations performed by transmission adjustment component 312 either independently of or in cooperation with terminal 310.

In accordance with one aspect, terminal 310 can monitor OSI bits broadcast by neighbor access points in system 300 and can be configured to only respond to an OSI bit of a dominant interference sector 330, which can have the smallest channel gain ratio of the neighbor access points. In one example, if the OSI bit of dominant interference sector 330 is set to '1,' due to, for example, dominant interference sector 330 observing higher than nominal inter-sector interference, then transmission adjustment component 312 can accordingly adjust the reverse link transmission resources utilized by terminal 310 downward and instruct retransmission of the most recent reverse link transmission to serving sector 320. Conversely, if the OSI bit of dominant interference sector 330 is set to '0,' transmission adjustment component 312 can adjust the reverse link transmission resources of terminal 310 upward. Alternatively, transmission adjustment component 312 can utilize OSI bits from more than one access point and can utilize various algorithms to adjust the reverse link transmission resources of terminal 310 and to initiate reverse link retransmissions 324 based on the multiple received OSI bits.

In accordance with another aspect, reverse link transmit power and/or other resources utilized by terminal 310 can be adjusted by transmission adjustment component 312 based on fast OSI indications received from dominant interference sector 330 utilizing a power metric computed by transmission adjustment component 312. For example, if transmission of a packet by terminal 310 causes interference at dominant interference sector 330, dominant interference sector 330 can indicate to terminal 310 to lower the transmit power used for retransmission of the packet. This can be done, for example, by interlacing an OSI indication to terminal 310 as illustrated in FIG. 3A with the transmission of the packet associated with the OSI indication.

Figure 4:
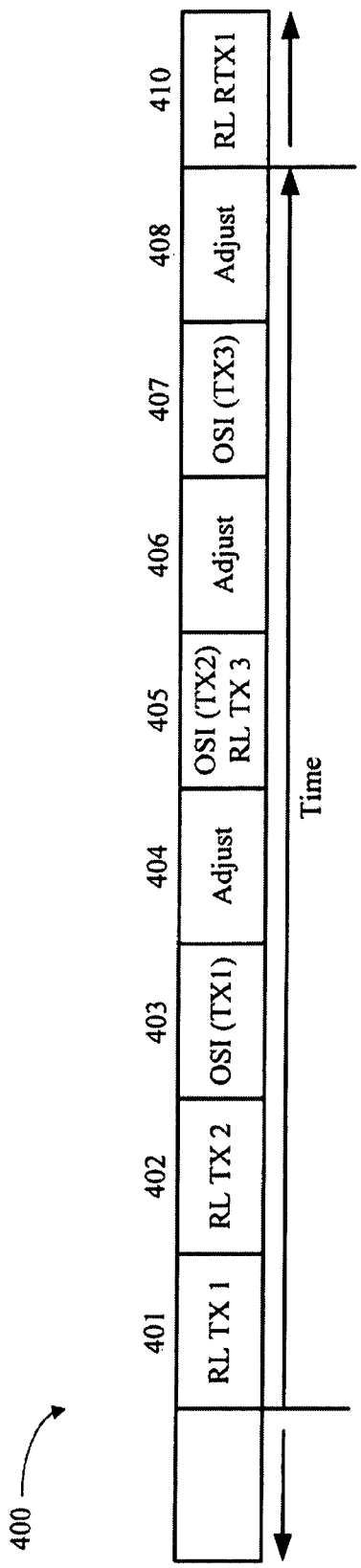
FIG. 4 illustrates an example reverse link transmission timeline in accordance with various aspects.

Transmissions, adjustments, and subsequent retransmissions of packets on the reverse link by terminal 310 in system 300 based on OSI indications from dominant interference sector 330 can proceed as illustrated by timeline 400 in FIG. 4. In accordance with one aspect, transmission adjustment component 312 can perform adjustments to resources utilized by terminal 310 before retransmission of the packet that caused the OSI upon receiving an OSI indication. For example, as illustrated by timeline 400, a first reverse link transmission can be conducted at interlace 401, and an OSI indication corresponding to the transmission can be received at interlace 403. Based on the OSI indication, a resource adjustment can be performed at interlace 404 for retransmission of the first packet at interlace 410. Similarly, a second reverse link transmission can be conducted at interlace 402, and a second resource adjustment can be performed at interlace 408 based on an OSI indication corresponding to the second transmission received at interlace 405. An OSI indication can also be received on a common interlace with a reverse link transmission, as illustrated by the third reverse link transmission at interlace 405. An OSI indication for the third transmission may also be received, as indicated at interlace 407. A retransmission for a given packet can occur eight interlaces after the initial transmission, as illustrated by interlaces 401 and 410 in timeline 400, or alternatively retransmission can occur at any other appropriate uniform or non-uniform interval following an initial transmission.

In one example, the transmit power for retransmission of a packet can be determined by determining whether an original transmission caused an OSI indication and requires an adjustment. If so, terminal 310 can check for other adjustments that have been made within a predetermined number of interlaces, select the lowest of the adjusted power values that was noted to have caused an OSI indication, and step the lowest such power value down by a delta offset value. Alternatively, if it is determined that the original transmission did not cause an OSI indication, terminal 310 can check for other adjustments that have been made within a predetermined number of interlaces, select the highest of the adjusted power values that was noted not to have caused an OSI indication, and step the highest such power value up by a delta offset value. In another example, the delta values and/or power metrics used to adjust transmission resources can be predetermined or calculated using one or more techniques as described infra.

In another example, a new assignment for transmission resources for terminal 310 may arrive from serving sector 320 and/or another appropriate entity in system 300 during any interlace on timeline 400. The new assignment can comprise, for example, a delta value that provides PSD based on adjustments of previous interlaces. Based on the new assignment, terminal 310 can report a power metric used by terminal 310 to adjust transmission resources to serving sector 320 at the start of a following reverse link transmission in order to allow serving sector 320 to utilize the power metric in new assignments for terminal 310. In one example, if it is determined by serving sector 320 that OSI exists based on a report from terminal 310, serving sector 320 can step down the transmit power utilized by terminal 310 in a subsequent assignment.

Figure 5:
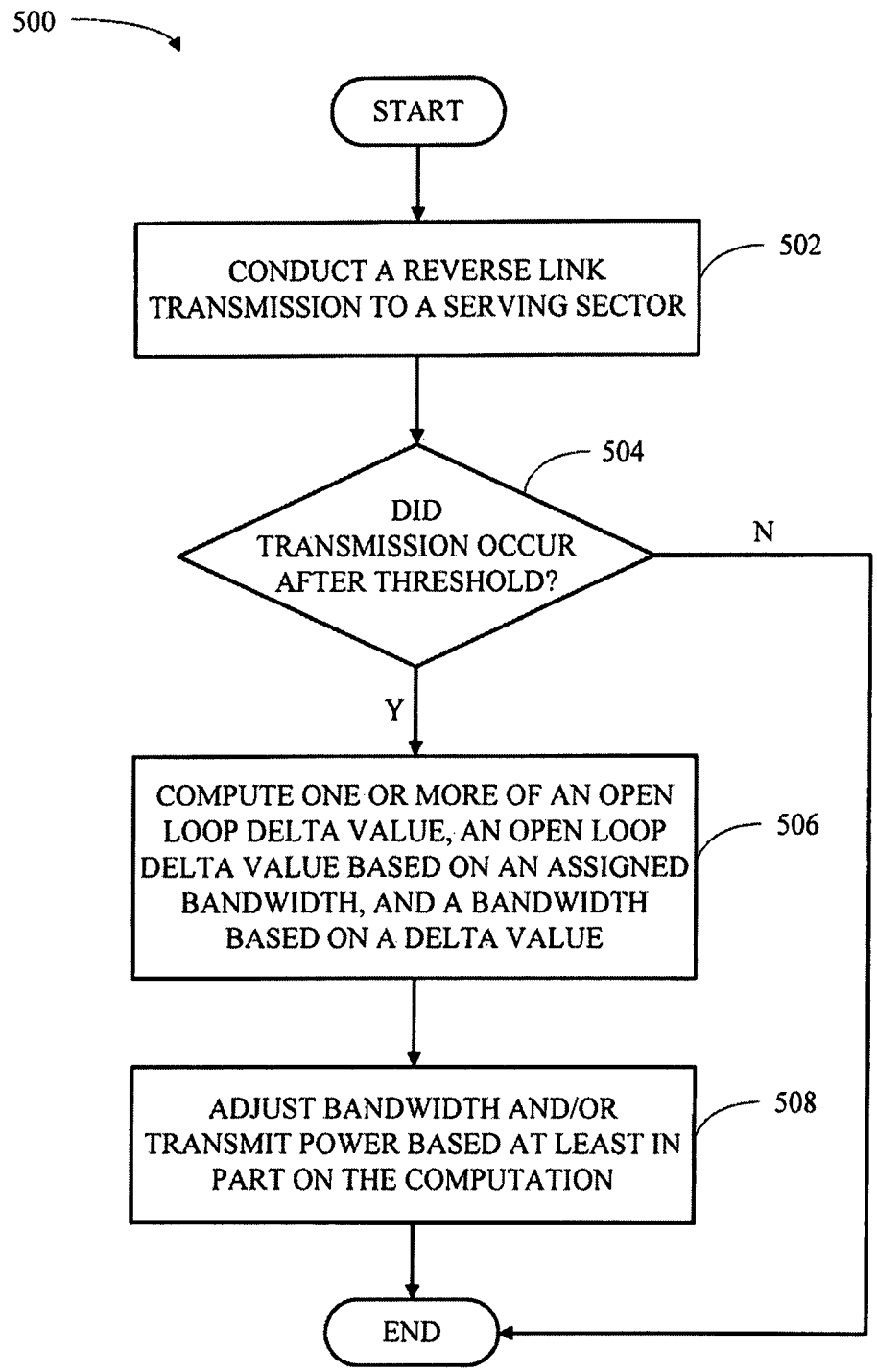
FIG. 5 is a flow diagram of a methodology for adjusting reverse link transmission resources in a wireless communication system.
Figure 6:
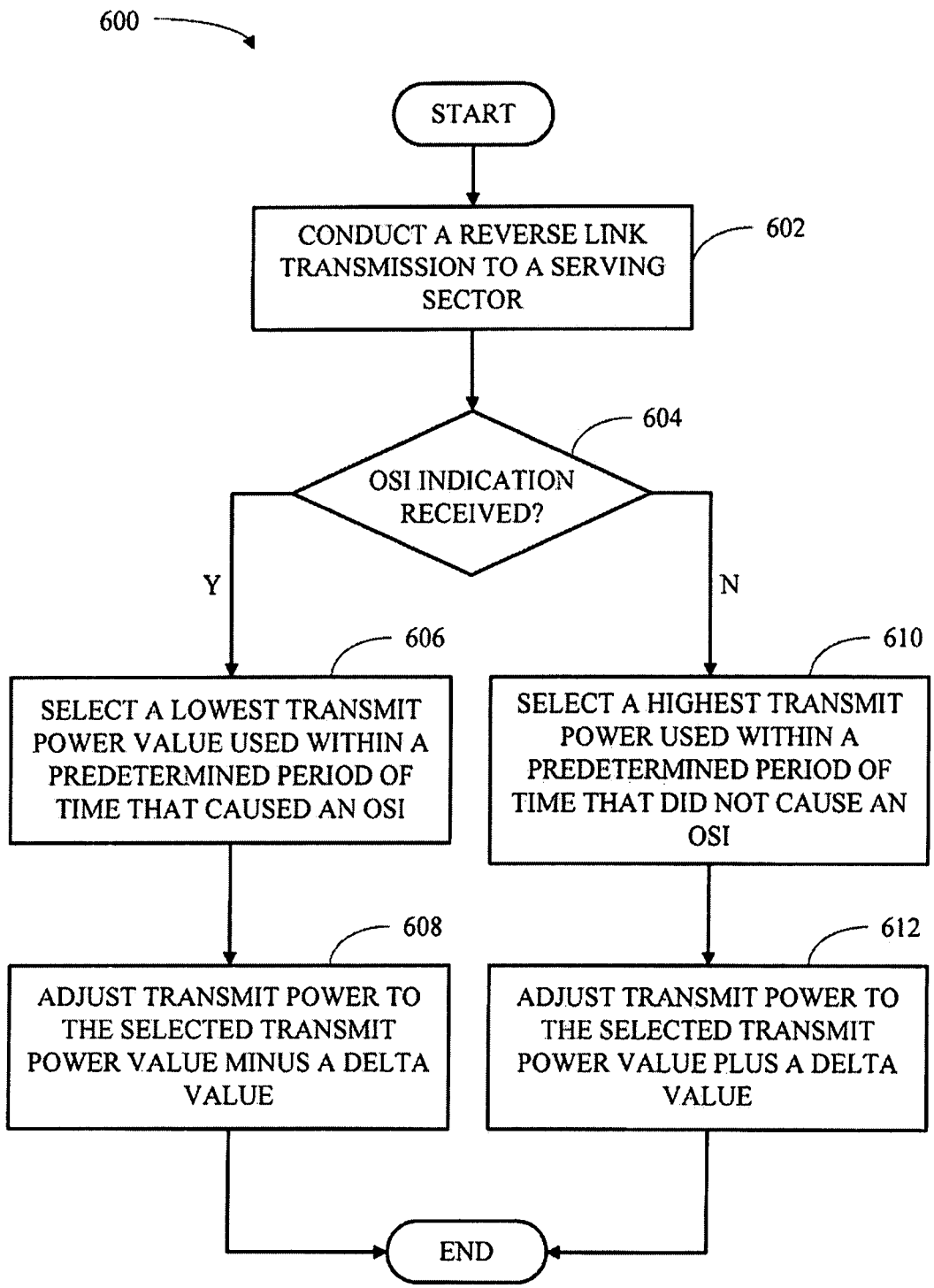
FIG. 6 is a flow diagram of a methodology for adjusting reverse link transmission resources to reduce interference in a wireless communication system.
Figure 7:
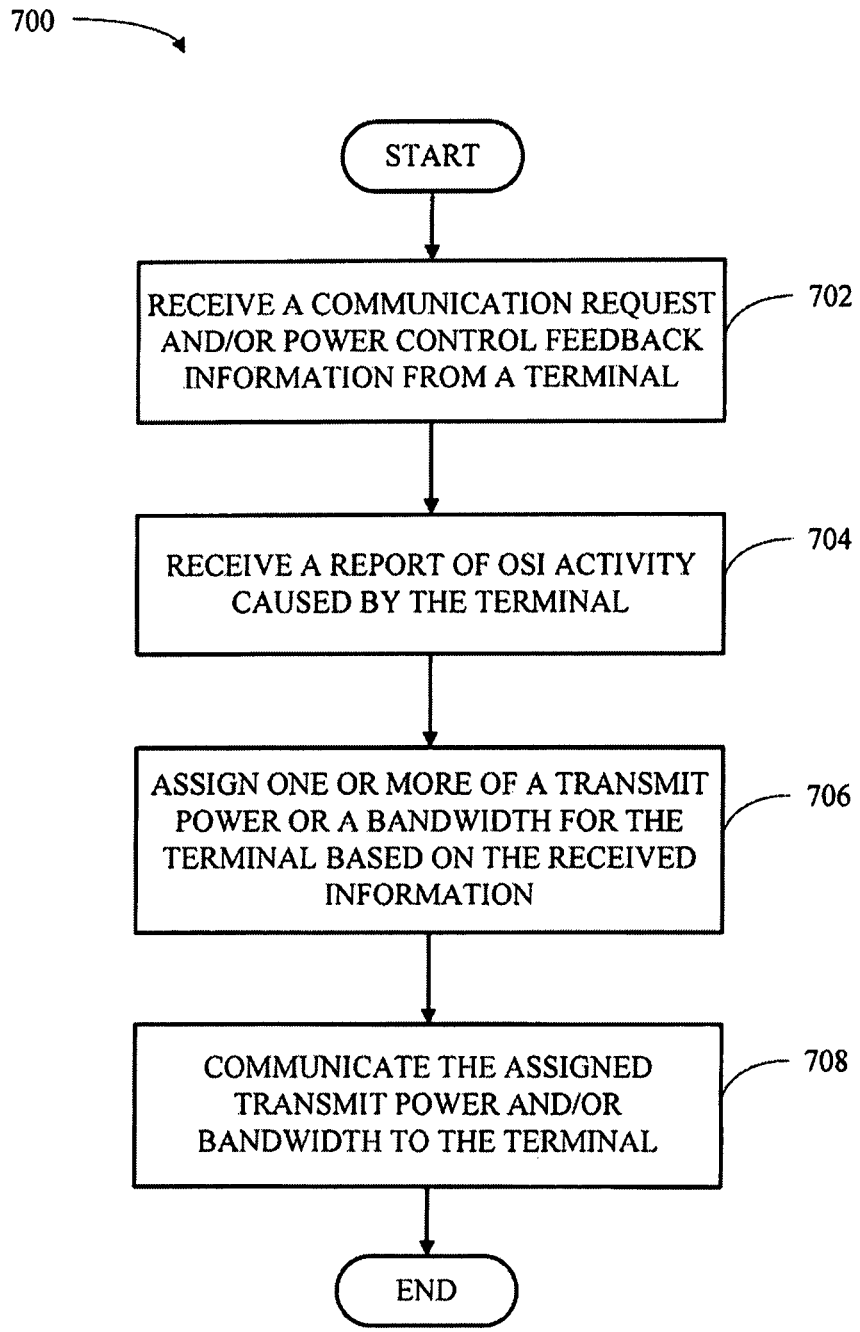
FIG. 7 is a flow diagram of a methodology for conducting reverse link power control and interference management in a wireless communication system.

Referring to FIGS. 5-7, methodologies for delta-based power control and interference management in a wireless communication system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 5, illustrated is a methodology 500 for adjusting reverse link transmission resources in a wireless communication system (e.g., system 200). It is to be appreciated that methodology 500 can be performed by, for example, a terminal (e.g., terminal 210) and/or any other appropriate network entity. Methodology 500 begins at block 502, wherein a reverse link transmission to a serving sector (e.g., base station 220) is conducted. Next, at block 504, it is determined whether the reverse link transmission conducted at 502 occurred after a predetermined threshold. The threshold can be based on, for example, a number of frames or superframes, a time period, a number of assignment messages, a number of erasure measurements, and/or other metrics.

If it is determined at block 504 that the transmission conducted at block 502 did not occur after the threshold, methodology 500 concludes. Otherwise, methodology 500 proceeds to block 506, wherein one or more of an open-loop delta value, an open-loop delta value based on an assigned bandwidth, and a bandwidth based on a delta value are computed. In one example, open loop adjustments performed at block 506 can be restricted to the beginning of respective transmission bursts, such as after the threshold utilized in block 504 has passed. Alternatively, open loop projections can be computed at block 506 on interlaces on which an entity performing methodology 500 is not scheduled in order to determine a maximum value for a fast delta value to prevent the delta value from becoming too large due to little OSI indication activity.

In accordance with one aspect, computations of an open-loop delta value, an open-loop delta value based upon bandwidth assigned for transmission, and/or a bandwidth assigned for transmission based upon a delta value that can be performed at block 506 can proceed as described in the following non-limiting examples. In one example, to compute an open-loop delta value at block 506 to control a maximum PSD rise, a delta value can be calculated such that $$(IoT_{avg}+pCoT\times\Delta)/IoT_{avg}<IoT\text{Rise}_{max}. \qquad (4)$$

As used in Equation (4), $IoT_{avg}$ is an interference offset value that can be provided as a system parameter; for example, it can be broadcast by the non-serving sector for which the open-loop adjustment at block 506 is being calculated and/or from a sector having the smallest channel gain difference with a serving sector. In one example, $IoT_{avg}$ can be set to a fixed value for simplicity of system design and/or to reduce the amount of feedback required for power control. In such an example, $IoT_{avg}$ can be set to a conservative value (e.g., 1, thereby assuming no current interference other than thermal noise), a nominal IoT value such as $IoT_{target}$, and/or another appropriate value. Further, pCoT corresponds to a measurement of received signal power (e.g., received carrier PSD over thermal PSD) on a reference channel (e.g., a reverse link pilot channel, channel quality indicator channel, and/or any other reference channel) at a non-serving sector. The value of pCoT can be communicated over a dedicated forward link channel, such as a forward link pilot quality channel (F-PQICH), communicated from a non-serving sector, obtained by appropriately adjusting corresponding parameters for the serving sector using channel gain difference values, and/or by other means. In addition, $IoTRise_{max}$ indicates a maximum allowable rise in an amount of interference caused by any access terminal at a non-serving sector. The value of $IoTRise_{max}$ can be a system configuration or overhead provided value.

In another example, in the event that a delta value computed using the above technique is smaller than a minimum delta value ($\Delta_{min}$) a maximum supportable bandwidth, $W_{max}$, can be allocated down by a predetermined amount or based on the following:

$$(IoT_{avg} + W_{max}/W_{tot} \times pCoT \times \Delta_{min})/IoT_{avg} < IoTRise_{max}. \quad (5)$$

where $W_{tot}$ is the total system bandwidth.

In an additional example, an open-loop delta can be computed at block 506 to control an average PSD rise based on an assigned bandwidth W as follows:

$$(IoT_{avg} + W/W_{tot} \times pCoT \times \Delta)/IoT_{avg} < IoTRise_{max}. \quad (6)$$

Further, as additional information to aid the serving sector in assigning W, a maximum supportable bandwidth, $W_{max}$, can also be computed based on the minimum delta value ($\Delta_{min}$) such that $$(IoT_{avg} + W_{max}/W_{tot} \times pCoT \times \Delta_{min})/IoT_{avg} < IoTRise_{max} \quad (7)$$

and communicated to the serving sector prior to assignment.

In a further example, the amount of interference at the beginning of each transmission burst can also be controlled at block 506 by limiting an initial maximum supportable bandwidth based on a current delta value and controlling the average PSD rise. In this case a maximum supportable bandwidth ($W_{max}$) value can be calculated such that $$(IoT_{avg} + W_{max}/W_{tot} \times pCoT \times \Delta)/IoT_{avg} < IoTRise_{max}. \quad (8)$$

and communicated to the serving access point. The serving access point can then gradually increase assigned bandwidth over subsequent assignments to allow enough time for fast OSI indications to adjust the delta value.

In accordance with another aspect, the serving sector can utilize data carrier to interference (DataCtoI) values for assigning resources to an entity performing methodology 500 while a corresponding delta value can be utilized by the entity performing methodology 500. In addition, each packet format can have an associated $DataCtoI_{min}$ and/or $\Delta_{min}$ value. In one example, a lookup table can be maintained that includes a $DataCtoI_{min}$, to be utilized. Further, an index into the lookup table can be provided at block 506 for each packet format to allow an entity performing methodology 500 and/or the serving sector to associate with a $DataCtoI_{min}$ value and/or a $\Delta_{min}$ for the packet format.

Upon completing the calculations at block 506, methodology 500 concludes at block 508, wherein bandwidth and/or transmit power is adjusted (e.g., by a transmission adjustment component 312) based at least in part on the computation performed at block 506. In accordance with one aspect, a first delta value (e.g., $\Delta_{slow}$) can be computed at block 506 based on slow OSI indications from a neighboring access point. The first delta value can be used as a maximum value for other parameters computed at block 506 and/or as feedback to the serving sector separately or in combination with power headroom, interference reports, and/or other feedback for future resource assignments. In one example, a second delta value (e.g., $\Delta_{tx}$) can additionally be computed at block 506 and utilized for adjustments to transmit power and/or bandwidth at block 508.

In accordance with another aspect, resource adjustments at block 508 can be made based on a value of $\Delta_{tx}$ as follows: First, for each interlace i, a power metric $PM_i$ can be defined as a product of a received CoT value from the serving sector and an assigned bandwidth on the interlace, e.g., $PM_i = CoT_i \times BW_i$. Maximum and minimum power metrics can then be calculated for each interlace as follows:

$$PM_{min,i} = \min_{\substack{j=i-numinterlaces,\ldots,i-1 \\ PM_j > 0, OSI_j = 1}} PM_j \quad (9)$$

$$PM_{max,i} = \max_{\substack{j=i-numinterlaces,\ldots,i-1 \\ PM_j > 0, OSI_j = 0}} PM_j.$$

Based on these values, a power metric for interlace i can then be set as follows:

$$PM_i = \begin{cases} PM_{min,i} - stepDown & OSI_{i-numinterlaces} = 1 \\ PM_{max,i} + stepUp & OSI_{i-numinterlaces} = 0, \end{cases} \quad (10)$$

subject to the constraint $$\Delta_{min,i} \leq \Delta_{tx,i} \leq \Delta_{assigned,i}. \quad (11)$$

Additionally and/or alternatively, a transmit PSD utilized for reverse link data communication on a physical channel (e.g., R-DCH) can be adjusted at block 508 based on an assignment from the serving sector as follows:

$$PSD_{R-DCH} = PSD_{R-PICH} + \Delta_{tx} + AttemptBoost_j, \quad (12)$$

where j is a sub-packet index and $AttemptBoost_j$ is a power boost parameter assigned by the serving sector.

In accordance with a further aspect, data channels utilized by each sector in system 300 can be multiplexed such that they are orthogonal to one another. However, despite such multiplexing, some loss in orthogonality can result from inter-carrier interference (ICI), inter-symbol interference (ISI), and/or other causes, from which intra-sector interference can result. To mitigate intra-sector interference, the transmit PSD of terminal 310 may be controlled by transmission adjustment component 312 such that the amount of intra-sector interference that terminal 310 may cause to other terminals in the same sector is maintained within an acceptable level. This may be achieved, for example, by constraining the transmit PSD delta, $\Delta P(n)$, to be within a corresponding range $\Delta P(n) \in [\Delta P_{min}, \Delta P_{max}]$, where $\Delta P_{min}$ and $\Delta P_{max}$ are respectively the minimum and maximum transmit PSD deltas allowable for a given data channel.

FIG. 6 illustrates a methodology 600 for adjusting reverse link transmission resources to reduce interference in a wireless communication system (e.g., system 300). It is to be appreciated that methodology 600 can be performed by, for example, a terminal (e.g., terminal 310) and/or any other appropriate network entity in a wireless communication system. Methodology 600 begins at blocks 602, wherein a reverse link transmission to a serving sector (e.g., serving sector 320) is conducted. Next, at block 604, it is determined whether an OSI indication is received (e.g., from dominant interference sector 330). In one example, if transmission of a packet by an entity performing methodology 600 causes interference at a neighboring sector, that sector can transmit an OSI indication to request that transmit power used for a subsequent retransmission be lowered. This can be done, for example, by interlacing the OSI indication with the transmission at block 602.

If an OSI indication is received at block 604, methodology 600 can proceed to block 606, wherein a lowest transmit power value used within a predetermined period of time that caused an OSI is selected. In one example, an entity performing methodology 600 can check for other adjustments that have been made within a predetermined number of interlaces or another predetermined time period and select the lowest of the adjusted power values that was noted to have caused an OSI indication. Methodology 600 can then conclude at block 608, wherein transmit power (e.g., transmit power used for retransmission of the transmission conducted at block 602) is adjusted by subtracting a delta offset value from the transmit power value selected at block 606.

Alternatively, if an OSI indication is not received at block 604, methodology 600 can instead proceed to block 610, wherein a highest transmit power used within a predetermined period of time that did not cause an OSI is selected. In one example, an entity performing methodology 600 can check for other adjustments that have been made within a predetermined number of interlaces or another predetermined time period and select the highest of the adjusted power values that was noted not to have caused an OSI indication. Methodology 600 can then conclude at block 612, wherein transmit power (e.g., transmit power used for retransmission of the transmission conducted at block 602) is adjusted by adding a delta offset value from the transmit power value selected at block 610.

FIG. 7 illustrates a methodology 700 for conducting reverse link power control and interference management in a wireless communication system (e.g., system 200). It is to be appreciated that methodology 700 can be performed by, for example, an access point (e.g., base station 220) and/or any other suitable network entity in a wireless communication system. Methodology 700 begins at block 702, wherein a communication request and/or power control feedback information is received from a terminal (e.g., terminal 210). Methodology 700 then proceeds to block 704, wherein a report of OSI activity caused by the terminal is received. In one example, information received at blocks 702 and 704 can be received together in a common communication or in separate communications. Additionally, the report received at block 704 can be communicated to an entity performing methodology 700 by the terminal or by another appropriate entity in the system (e.g., a neighboring base station).

Next, at block 706, one or more of a transmit power or a bandwidth for the terminal can be assigned (e.g., by a power control component 224) based on the received information at blocks 702 and 704. In one specific example, ΔP(n) and/or other parameters utilized for generating a resource assignment for a terminal can be computed at block 706 based on a reference PSD level $P_{ref}(n)$, the power of signals received on reverse link channel quality indicator and/or request channels from the terminal, and/or other factors. In such an example, carrier-to-interference offset can be determined along with a value for interference minus rise over thermal noise power, and these values can be used to offset the power of signals received on the reverse link from the terminal and/or transmitted as power control commands at block 708. In one example, carrier-to-interference offset can be determined as a function of intra-sector interference and other terminals in a given sector. Further, IoT values can be calculated at block 706 and/or received from other access points or sectors. Additionally and/or alternatively, RoT values may be calculated at block 706 as known. In another example, offsets used at block 706 can be based on steps, other variations, and/or system-dependent delta factors. Upon completing the assignments at block 706, methodology concludes at block 708, wherein the assigned transmit power and/or bandwidth is communicated to the terminal.

Figure 8:
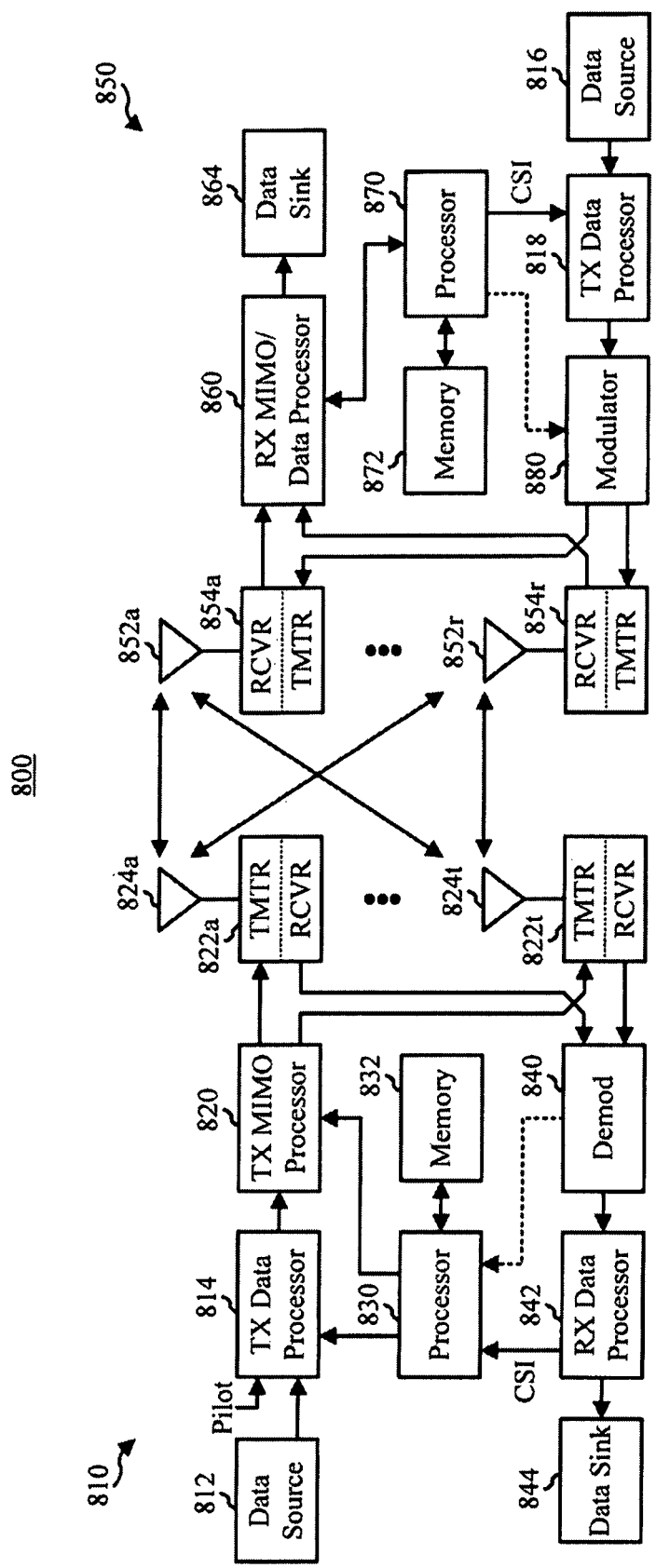
FIG. 8 is a block diagram illustrating an example wireless communication system in which one or more embodiments described herein may function.

Referring now to FIG. 8, a block diagram illustrating an example wireless communication system 800 in which one or more embodiments described herein may function is provided. In one example, system 800 is a multiple-input multiple-output (MIMO) system that includes a transmitter system 810 and a receiver system 850. It should be appreciated, however, that transmitter system 810 and/or receiver system 850 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 810 and/or receiver system 850 described herein could be utilized in connection with a single output to single input antenna system.

In accordance with one aspect, traffic data for a number of data streams are provided at transmitter system 810 from a data source 812 to a transmit (TX) data processor 814. In one example, each data stream can then be transmitted via a respective transmit antenna 824. Additionally, TX data processor 814 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 850 to estimate channel response. Back at transmitter system 810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 830.

Next, modulation symbols for all data streams can be provided to a TX processor 820, which may further process the modulation symbols (e.g., for OFDM). TX MIMO processor 820 may then provides $N_T$ modulation symbol streams to $N_T$ transmitters (TMTR) 822a through 822t. In one example, each transmitter 822 can receive and process a respective symbol stream to provide one or more analog signals. Each transmitter 822 may then further condition (e.g., amplify, filter, and upconvert) the analog signals to provide a modulated signal suitable for transmission over a MIMO channel. Accordingly, $N_T$ modulated signals from transmitters 822a through 822t can then be transmitted from $N_T$ antennas 824a through 824t, respectively.

In accordance with another aspect, the transmitted modulated signals can be received at receiver system 850 by $N_R$ antennas 852a through 852r. The received signal from each antenna 852 can then be provided to a respective receiver (RCVR) 854. In one example, each receiver 854 can condition (e.g., filter, amplify, and downconvert) a respective received signal, digitize the conditioned signal to provide samples, and then processes the samples to provide a corresponding "received" symbol stream. An RX MIMO/data processor 860 can then receive and process the $N_R$ received symbol streams from $N_R$ receivers 854 based on a particular receiver processing technique to provide $N_T$ "detected" symbol streams. In one example, each detected symbol stream can include symbols that are estimates of the modulation symbols transmitted for the corresponding data stream. RX processor 860 can then process each symbol stream at least in part by demodulating, deinterleaving, and decoding each detected symbol stream to recover traffic data for a corresponding data stream. Thus, the processing by RX processor 860 may be complementary to that performed by TX MIMO processor 820 and TX data processor 814 at transmitter system 810. RX processor 860 may additionally provide processed symbol streams to a data sink 864.

In accordance with one aspect, the channel response estimate generated by RX processor 860 may be used to perform space/time processing at the receiver, adjust power levels, change modulation rates or schemes, and/or other appropriate actions. Additionally, RX processor 860 may further estimate channel characteristics such as, for example, signal-to-noise-and-interference ratios (SNRs) of the detected symbol streams. RX processor 860 can then provide estimated channel characteristics to a processor 870. In one example, RX processor 860 and/or processor 870 can further derive an estimate of the "operating" SNR for the system. Processor 870 can then provide channel state information (CSI), which may comprise information regarding the communication link and/or the received data stream. This information may include, for example, the operating SNR. The CSI can then be processed by a TX data processor 818, modulated by a modulator 880, conditioned by transmitters 854a through 854r, and transmitted back to transmitter system 810. In addition, a data source 816 at receiver system 850 may provide additional data to be processed by TX data processor 818.

Back at transmitter system 810, the modulated signals from receiver system 850 can then be received by antennas 824, conditioned by receivers 822, demodulated by a demodulator 840, and processed by a RX data processor 842 to recover the CSI reported by receiver system 850. In one example, the reported CSI can then be provided to processor 830 and used to determine data rates as well as coding and modulation schemes to be used for one or more data streams. The determined coding and modulation schemes can then be provided to transmitters 822 for quantization and/or use in later transmissions to receiver system 850. Additionally and/or alternatively, the reported CSI can be used by processor 830 to generate various controls for TX data processor 814 and TX MIMO processor 820. In another example, CSI and/or other information processed by RX data processor 842 can be provided to a data sink 844.

In one example, processor 830 at transmitter system 810 and processor 870 at receiver system 850 direct operation at their respective systems. Additionally, memory 832 at transmitter system 810 and memory 872 at receiver system 850 can provide storage for program codes and data used by processors 830 and 870, respectively. Further, at receiver system 850, various processing techniques may be used to process the $N_R$ received signals to detect the $N_T$ transmitted symbol streams. These receiver processing techniques can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 9:
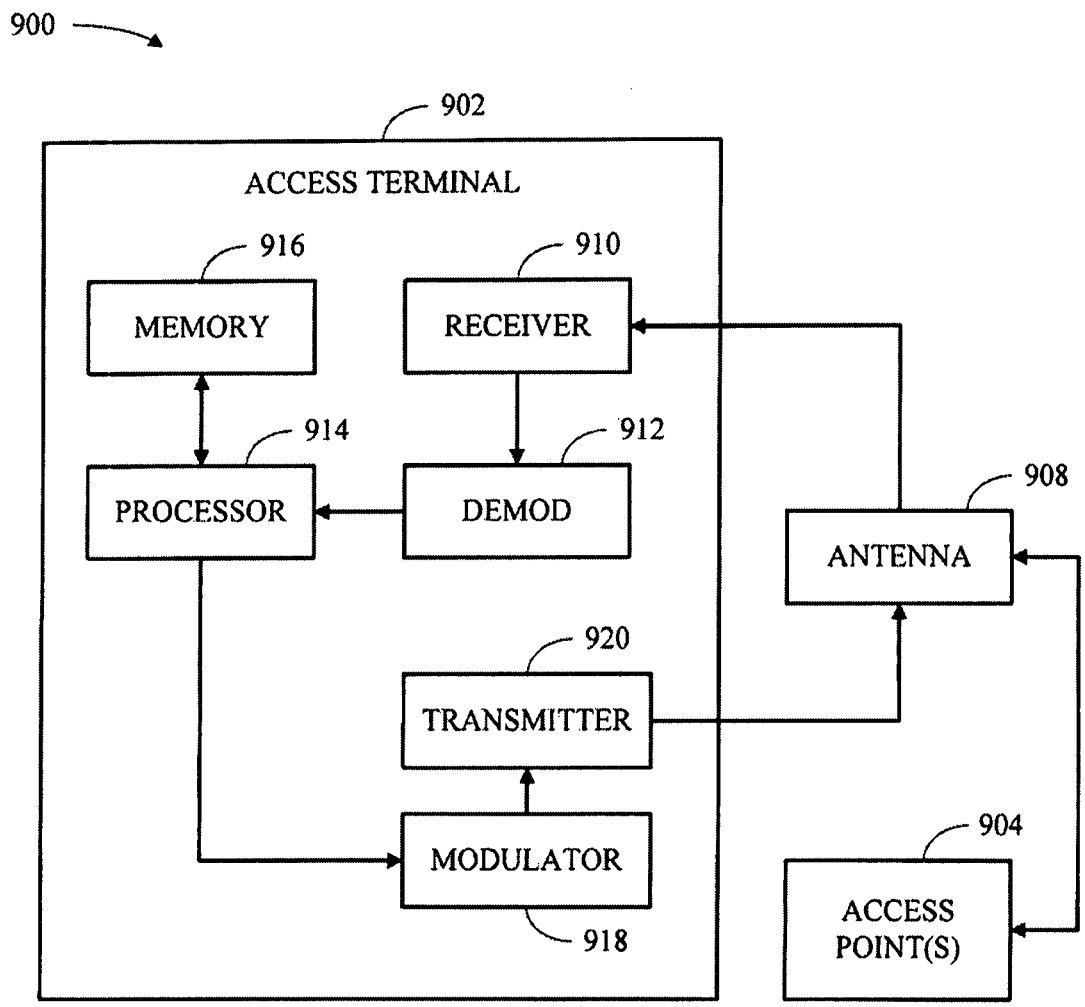
FIG. 9 is a block diagram of a system that facilitates reverse link power control in accordance with various aspects.

FIG. 9 is a block diagram of a system 900 that facilitates reverse link power control in a wireless communication system in accordance with various aspects. In one example, system 900 includes an access terminal 902. As illustrated, access terminal 902 can receive signal(s) from one or more access points 904 and transmit to the one or more access points 904 via an antenna 908. Additionally, access terminal 902 can comprise a receiver 910 that receives information from antenna 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to access terminal 902. Additionally, access terminal 902 can employ processor 914 to perform methodologies 500, 600, and/or other appropriate methodologies. Access terminal 902 can also include a modulator 918 that can multiplex a signal for transmission by a transmitter 920 via antenna 908 to one or more access points 904.

Figure 10:
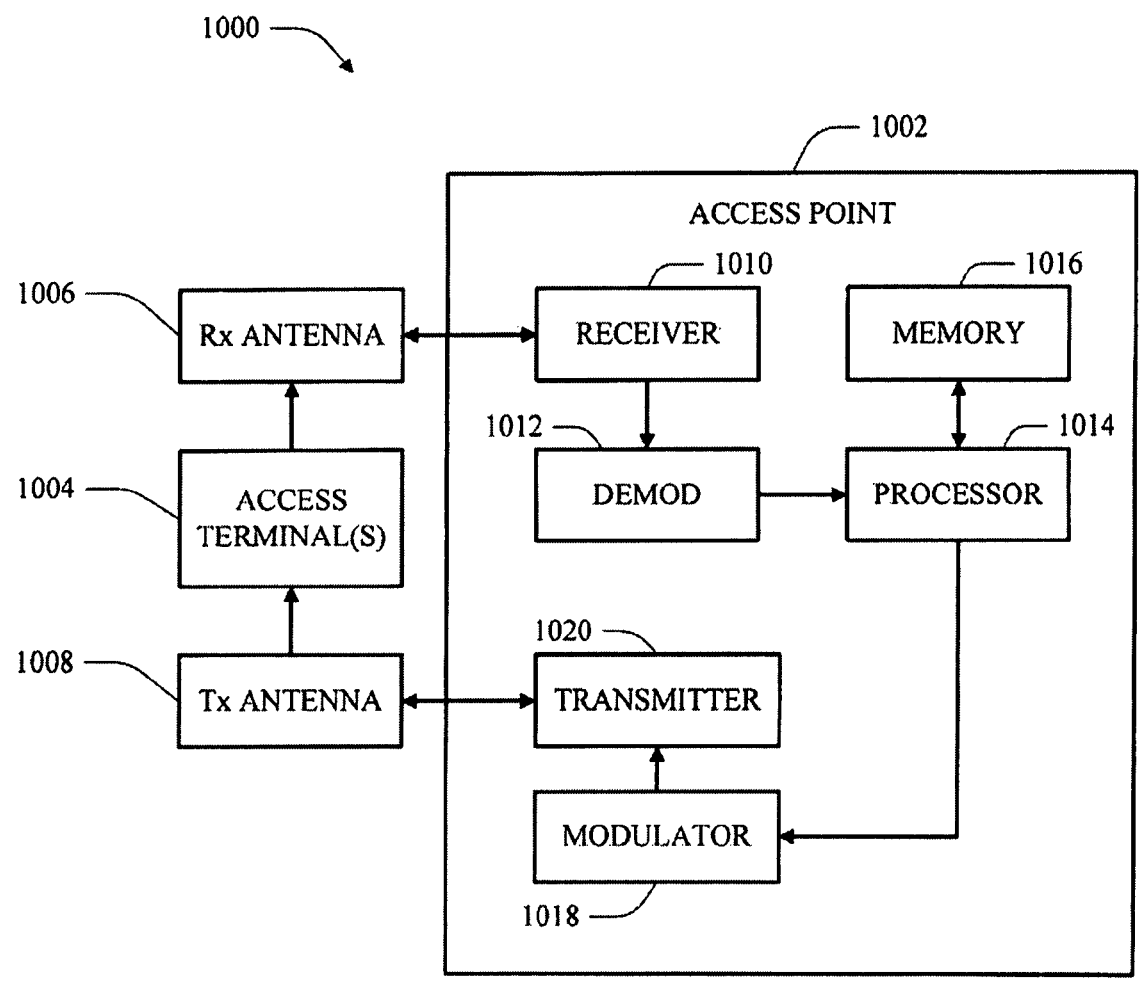
FIG. 10 is a block diagram of a system that coordinates reverse link power control and interference management in accordance with various aspects.

FIG. 10 is a block diagram of a system 1000 that coordinates reverse link power control and interference management in a wireless communication system in accordance with various aspects described herein. In one example, system 1000 includes a base station or access point 1002. As illustrated, access point 1002 can receive signal(s) from one or more access terminals 1004 via a receive (Rx) antenna 1006 and transmit to the one or more access terminals 1004 via a transmit (Tx) antenna 1008.

Additionally, access point 1002 can comprise a receiver 1010 that receives information from receive antenna 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, access point 1002 can employ processor 1014 to perform methodology 700 and/or other appropriate methodologies. Access point 1002 can also include a modulator 1018 that can multiplex a signal for transmission by a transmitter 1020 through transmit antenna 1008 to one or more access terminals 1004.

Figure 11:
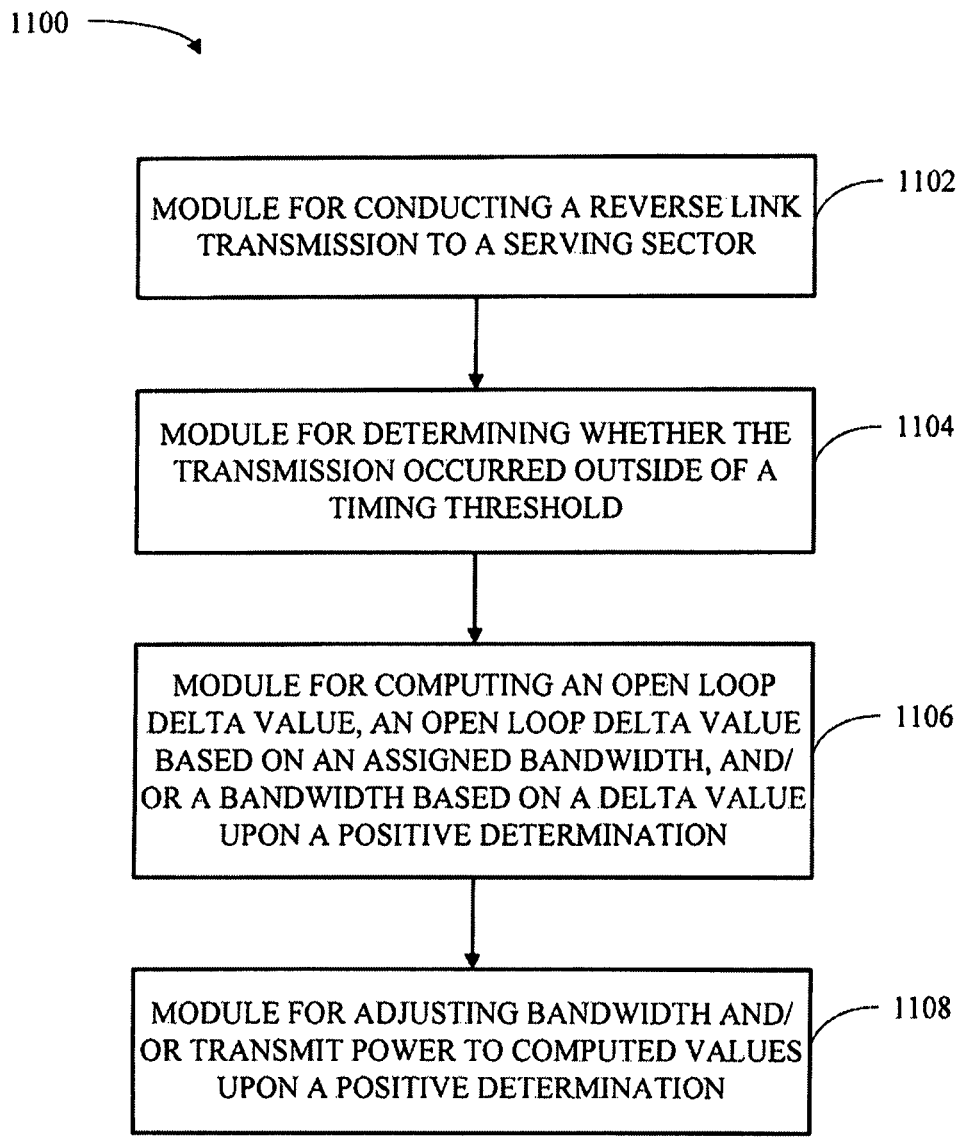
FIG. 11 is a block diagram of an apparatus that facilitates initial transmission resource adjustments in a wireless communication system.

FIG. 11 illustrates an apparatus 1100 that facilitates initial transmission resource adjustments in a wireless communication system (e.g., system 200). It is to be appreciated that apparatus 1100 is represented as including functional blocks, which can be functional blocks that represent functions implemented by a processor, software, or combination thereof (e.g., firmware). Apparatus 1100 can be implemented in a terminal (e.g., terminal 210) and/or another suitable network entity and can include a module for conducting a reverse link transmission to a serving sector 1102. Further, apparatus 1100 can include a module for determining whether the transmission occurred outside of a timing threshold 1104. Apparatus can also include a module for computing an open loop delta value, an open loop delta value based on an assigned bandwidth, and/or a bandwidth based on a delta value upon a positive determination 1106. In addition, apparatus 1100 can include a module for adjusting bandwidth and/or transmit power to computed values upon a positive determination 1108.

Figure 12:
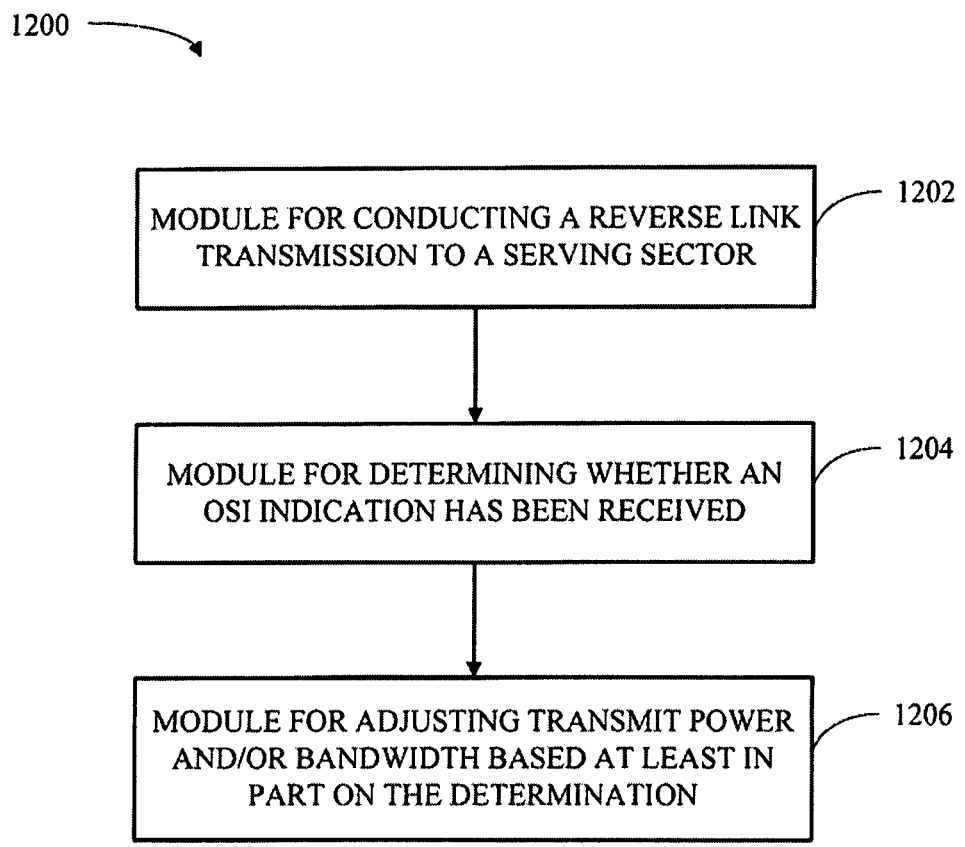
FIG. 12 is a block diagram of an apparatus that facilitates adjusting reverse link transmission resources for interference control in a wireless communication system.

FIG. 12 illustrates an apparatus 1200 that facilitates adjusting reverse link transmission resources for interference control in a wireless communication system. It is to be appreciated that apparatus 1200 is represented as including functional blocks, which can be functional blocks that represent functions implemented by a processor, software, or combination thereof (e.g., firmware). Apparatus 1200 can be implemented in a terminal and/or another suitable network entity and can include a module for conducting a reverse link transmission to a serving sector 1202. Further, apparatus 1200 can include a module for determining whether an OSI indication has been received 1204 and a module for adjusting transmit power and/or bandwidth based at least in part on the determination 1206.

Figure 13:
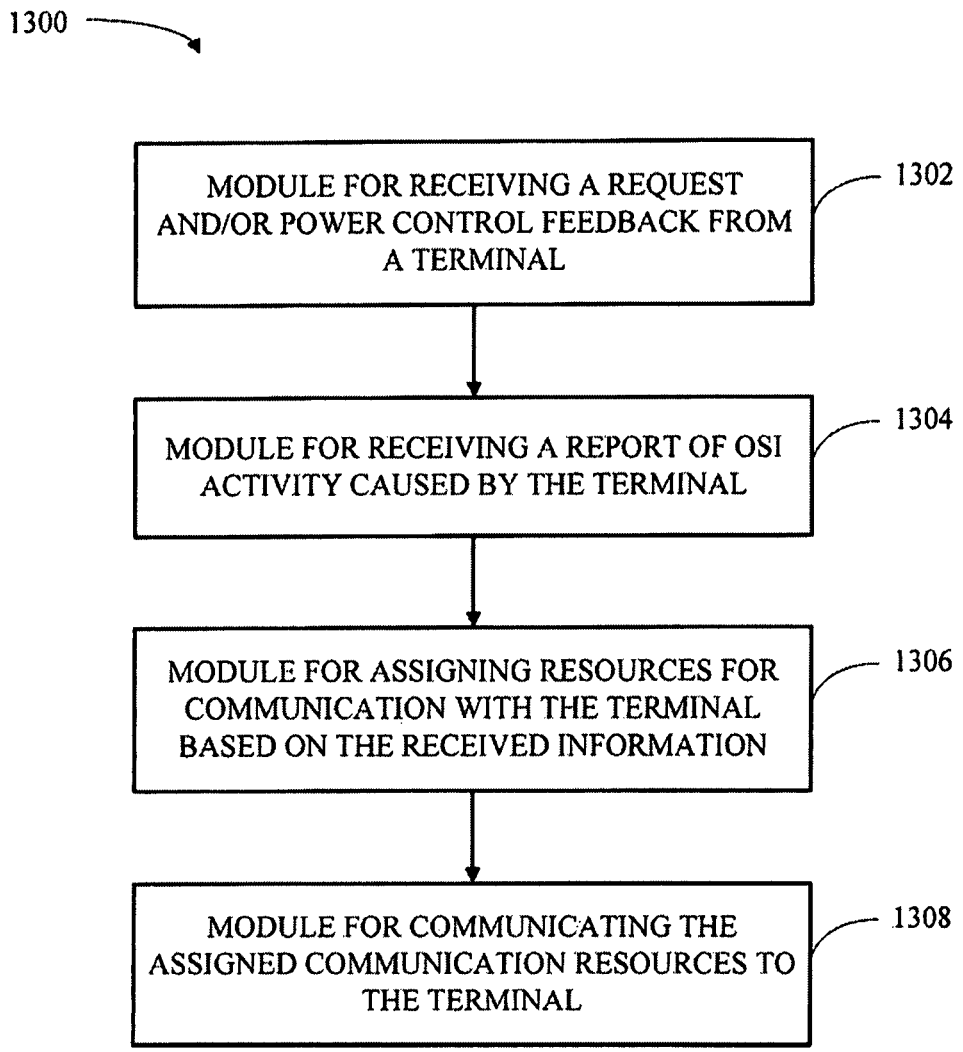
FIG. 13 is a block diagram of an apparatus that facilitates reverse link power control and interference management in a wireless communication system.

FIG. 13 illustrates an apparatus 1300 that facilitates reverse link power control and interference management in a wireless communication system. It is to be appreciated that apparatus 1300 is represented as including functional blocks, which can be functional blocks that represent functions implemented by a processor, software, or combination thereof (e.g., firmware). Apparatus 1300 can be implemented in an access point (e.g., base station 220) and/or another suitable network entity in a wireless communication system and can include a module for receiving a request and/or power control feedback from a terminal 1302. Further, apparatus 1300 can include a module for receiving a report of OSI activity caused by the terminal 1304, a module for assigning resources for communication with the terminal based on the received information 1306, and a module for communicating the assigned communication resources to the terminal 1308.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for power control in a wireless communication system, comprising:
    determining at a given time whether a preceding transmission occurred at a time preceding the given time by less than a predetermined timing threshold; and
    if the determining indicates the preceding transmission did not occur at a time preceding the given time by less than the predetermined timing threshold, then,
        computing one or more of an open loop delta value, an open loop delta value based on an assigned bandwidth, and a bandwidth based on a delta value, and
        adjusting one or more parameters to be used for a future transmission based at least in part on the computed values.

2. The method of claim 1, wherein the predetermined timing threshold is based on at least one of frames, a number of superframes, and a time period.

3. The method of claim 1, wherein the adjusting one or more parameters to be used for a future transmission includes adjusting a transmit power offset to be used for a future transmission.

4. The method of claim 1, wherein the adjusting one or more parameters to be used for a future transmission includes adjusting a bandwidth utilized for a future transmission.

5. The method of claim 1, wherein the adjusting one or more parameters to be used for a future transmission includes:
    adjusting a power spectral density (PSD) as a function of a computed open loop delta value; and
    adjusting a transmit power to be used for the future transmission based on the adjusted PSD.

6. The method of claim 1, wherein the adjusting one or more parameters to be used for a future transmission includes:
    determining whether an OSI (other sector interference) indication corresponding to the preceding transmission has been received; and
    adjusting one or more parameters to be used for the future transmission based at least in part on whether the OSI indication has been received.

7. The method of claim 6, wherein, if an OSI indication corresponding to the preceding transmission has been received, then the adjustment of one or more parameters to be used for the future transmission further includes:
    selecting a lowest transmit power used within a predetermined period of time that caused the OSI indication; and
    adjusting a transmit power to be used for the future transmission to the selected transmit power minus a delta value.

8. The method of claim 6, wherein, if an OSI indication corresponding to the preceding transmission has not been received, then the adjustment of one or more parameters to be used for the future transmission further includes:
    selecting a highest transmit power used within a predetermined period of time that did not cause an OSI indication, and
    adjusting a transmit power to be used for a future transmission to the selected transmit power plus a delta value.

9. The method of claim 1, wherein the adjustment of one or more parameters to be used for a future transmission includes:
   receiving an assignment for one or more parameters to be used for the future transmission from an access point; and
   adjusting the one or more parameters based on the assignment.

10. The method of claim 1, further comprising communicating one or more of the computed values and the adjusted parameters to an access point.

11. An apparatus that facilitates reverse link power control in a wireless communication system, comprising:
   means for conducting a transmission to a serving sector on a reverse link;
   means for determining whether the transmission occurred after a predetermined timing threshold after a preceding transmission to the serving sector;
   means for computing, upon a positive determination that the transmission occurred after the predetermined timing threshold after the preceding transmission, at least one of an open loop delta value, an open loop delta value based on an assigned bandwidth, or a bandwidth based on a delta value; and
   means for adjusting a parameter utilized for conducting transmissions to the serving sector based on the computed value.

12. The apparatus of claim 11, wherein the means for adjusting includes means for adjusting one or more of a transmit power offset and a bandwidth utilized for conducting transmissions to the serving sector.

13. The apparatus of claim 11, wherein the means for adjusting includes:
   means for adjusting a PSD based on the computed value; and
   means for adjusting a transmit power utilized for conducting transmissions to the serving sector based on the adjusted PSD.

14. The apparatus of claim 11, wherein the means for adjusting includes:
   means for receiving an assigned parameter from the serving sector; and
   means for adjusting a parameter utilized for communications with the serving sector based on the assigned parameter.

15. The apparatus of claim 11, further comprising means for communicating one or more of the computed value and the adjusted parameters to the serving sector.

16. The method of claim 1, wherein the computing is based at least in part on a maximum allowable inter-cell interference.

17. The method of claim 1, wherein the adjusting comprises:
   determining whether an OSI (other sector interference) indication corresponding to the preceding transmission has been received;
   selecting one of a lowest and a highest transmit power used within a predetermined period of time based on whether the OSI indication was received; and
   adjusting a transmit power to be used for a future transmission based on the selected transmit power and a delta value.

18. A mobile device comprising memory and a processor configured to perform a method comprising:
   determining at a given time whether a preceding transmission occurred at a time preceding the given time by less than a predetermined timing threshold; and
   if the determining indicates the preceding transmission did not occur at a time preceding the given time by less than the predetermined timing threshold, then,
      computing one or more of an open loop delta value, and open loop delta value based on an assigned bandwidth, and a bandwidth based on an assigned delta value, wherein the computing is based at least in part on a maximum allowable inter-cell interference parameter; and
      adjusting one or more parameters to be used for a future transmission based at least in part on the computed values.

19. The mobile device of claim 18, wherein the predetermined timing threshold is based on at least one of:
   a number of frames,
   a number of superframes, and
   a timing period.

20. A mobile device for power control in a wireless communication system, comprising:
   means for determining at a given time whether a preceding transmission occurred at a time preceding the given time by less than a predetermined timing threshold;
   means for computing, upon a positive determination that the transmission occurred at a time preceding the given time by less than the predetermined timing threshold, one or more of an open loop delta value, an open loop delta value based on an assigned bandwidth, and a bandwidth based on an assigned delta value, wherein the computations are based in part on a maximum allowable inter-cell interference parameter; and
   means for adjusting one or more parameters to be used for a future transmission based at least in part on the computed values.

21. A non-volatile, non-transitory, computer-readable storage medium comprising code for a causing a computer to:
   determine at a given time whether a preceding transmission occurred at a time preceding the given time by less than a predetermined timing threshold;
   compute, upon a positive determination that the transmission occurred at a time preceding the given time by less than the predetermined timing threshold, one or more of an open loop delta value, an open loop delta value based on an assigned bandwidth, and a bandwidth based on a delta value, wherein the computations are based in part on a maximum allowable inter-cell interference parameter; and
   adjust one or more parameters to be used for a future transmission based at least in part on the computed values.

22. A method in a wireless communication system to facilitate reverse link power control, the method comprising:
   conducting a transmission to a serving section on a reverse link;
   determining whether the transmission occurred after a predetermined timing threshold after a preceding transmission;
   computing, upon a positive determination that the transmission occurred after the predetermined timing threshold after the preceding transmission, at least one of an open loop delta value, an open loop delta value based on an assigned bandwidth, or a bandwidth based on a delta value; and
   adjusting a parameter utilized for conducting transmissions to the serving sector based on the computed value.

23. The method of claim 1, further comprising receiving an OSI indicator from a neighboring cell.

\* \* \* \* \*